United States Patent
Li et al.

(10) Patent No.: US 11,166,177 B2
(45) Date of Patent: *Nov. 2, 2021

(54) FLEXIBLE INTERLEAVING FOR WIRELESS COMMUNICATIONS

(71) Applicant: QUALCOMM Incorporated, San Diego, CA (US)

(72) Inventors: Wenjun Li, Basking Ridge, NJ (US); Tao Luo, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,778

(22) Filed: Jan. 27, 2020

(65) Prior Publication Data

US 2020/0221322 A1 Jul. 9, 2020

Related U.S. Application Data

(63) Continuation of application No. 15/893,459, filed on Feb. 9, 2018, now Pat. No. 10,595,217.

(60) Provisional application No. 62/458,559, filed on Feb. 13, 2017.

(51) Int. Cl.
*H04W 24/02* (2009.01)
*H04W 76/10* (2018.01)
(Continued)

(52) U.S. Cl.
CPC ........... *H04W 24/02* (2013.01); *H04L 1/0009* (2013.01); *H04L 1/0041* (2013.01);
(Continued)

(58) Field of Classification Search
None
See application file for complete search history.

(56) References Cited

U.S. PATENT DOCUMENTS 6,823,002 B1 * 11/2004 Betts .................. H04L 5/16 375/219
7,848,708 B2  12/2010 Matsumoto et al.
(Continued)

FOREIGN PATENT DOCUMENTS

CN    1720687 A    1/2006
CN    102869099 A   1/2013
(Continued)

OTHER PUBLICATIONS

International Search Report and Written Opinion—PCT/US2018/017853—ISA/EPO—dated May 29, 2018.
(Continued)

*Primary Examiner* — Eunsook Choi
(74) *Attorney, Agent, or Firm* — Qualcomm Incorporated

(57) ABSTRACT

Methods, systems, and devices for wireless communication are disclosed. Flexible interleaving configurations may be employed to support various operations, including beamforming. Flexible interleaving may include dynamically or semi-statically determining a combination of bit-level, tone-level, tone-group level, or other interleaving technique for one or more transmissions. The interleaving configuration may be based on delay spread, a coherence bandwidth, a signal to noise ratio, a Doppler spread, or a combination thereof. An interleaving configuration may be a determination may be made by a base station or some other network entity and explicitly signaled to another device. Additionally or alternatively, the determination may be made based on one or more implicit rules, which may be based on a variety of factors (e.g., available bandwidth, modulation and coding scheme (MCS), code block (CB) size). Further, interleaving may be enabled (or disabled) under certain conditions.

30 Claims, 12 Drawing Sheets

(51) Int. Cl.
*H04W 72/04* (2009.01)
*H04L 1/00* (2006.01)
*H04W 24/08* (2009.01)
*H04W 24/10* (2009.01)

(52) U.S. Cl.
CPC ....... *H04L 1/0071* (2013.01); *H04W 72/0453* (2013.01); *H04W 76/10* (2018.02); *H04L 1/0025* (2013.01); *H04W 24/08* (2013.01); *H04W 24/10* (2013.01)

(56) References Cited

U.S. PATENT DOCUMENTS

| | | | |
|---|---|---|---|
| 8,126,077 B2* | 2/2012 | Sandhu | H04L 5/0023 375/267 |
| 8,462,612 B2 | 6/2013 | Siaud et al. | |
| 8,477,732 B2* | 7/2013 | Higuchi | H04L 1/0009 370/332 |
| 9,231,608 B1 | 1/2016 | Pupalaikis et al. | |
| 10,153,867 B2 | 12/2018 | Chen et al. | |
| 10,305,633 B2 | 5/2019 | Manolakos et al. | |
| 10,333,650 B2 | 6/2019 | Chen et al. | |
| 2005/0047444 A1* | 3/2005 | Park | H04L 27/2608 370/480 |
| 2005/0135457 A1 | 6/2005 | Molisch et al. | |
| 2006/0182017 A1 | 8/2006 | Hansen et al. | |
| 2006/0221807 A1 | 10/2006 | Fukuoka et al. | |
| 2006/0233280 A1 | 10/2006 | Tynderfeldt et al. | |
| 2008/0024333 A1 | 1/2008 | Lee | |
| 2011/0105065 A1 | 5/2011 | Sampath et al. | |
| 2014/0016596 A1 | 1/2014 | Kim et al. | |
| 2015/0172781 A1 | 6/2015 | Yu et al. | |
| 2015/0195005 A1 | 7/2015 | De Lind Van Wijngaarden et al. | |
| 2016/0037550 A1 | 2/2016 | Barabell et al. | |
| 2016/0080043 A1 | 3/2016 | Tian et al. | |
| 2016/0366693 A1 | 12/2016 | Sawai | |
| 2017/0019288 A1* | 1/2017 | Sagong | H04B 7/068 |
| 2017/0026938 A1 | 1/2017 | Onggosanusi et al. | |
| 2017/0280453 A1* | 9/2017 | Choi | H04W 72/0453 |
| 2017/0310439 A1* | 10/2017 | Yang | H04L 27/0006 |
| 2018/0054757 A1 | 2/2018 | Nanri et al. | |
| 2018/0234863 A1 | 8/2018 | Li et al. | |

FOREIGN PATENT DOCUMENTS

| | | |
|---|---|---|
| CN | 103718612 A | 4/2014 |
| CN | 104168084 A | 11/2014 |
| CN | 104753643 A | 7/2015 |
| CN | 106105127 A | 11/2016 |
| CN | 106233650 A | 12/2016 |
| EP | 2854325 A1 | 4/2015 |
| KR | 20160136385 A | 11/2016 |
| WO | WO-2011003368 A1 | 1/2011 |
| WO | WO-2012024180 | 2/2012 |
| WO | WO-2015116767 A1 | 8/2015 |
| WO | WO-2015133836 A1 | 9/2015 |
| WO | WO-2016024758 A1 | 2/2016 |
| WO | WO-2016056876 A1 | 4/2016 |
| WO | WO-2016081378 A1 | 5/2016 |
| WO | WO-2016200877 A1 | 12/2016 |
| WO | WO-2017078829 A1 | 5/2017 |
| WO | WO-2018015793 A1 | 1/2018 |
| WO | WO-2018052659 | 3/2018 |
| WO | WO-2018148673 A1 | 8/2018 |

OTHER PUBLICATIONS

Li C., et al., "Performance Analysis of Symbol Interleaving for Next Generation mm-Wave MIMO WLAN", 2014, Sixth International Conference on Wireless Communications and Signal Processing (WCSP), IEEE, Oct. 23, 2014 (Oct. 23, 2014), XP032710738, pp. 6, DOI: 10.1109/WCSP.2014.6992035.

QUALCOMM Incorporated: "Codeword to Layer Mapping", 3GPP Draft; R1-1700795, 3rd Generation Partnership Project (3GPP), Mobile Competence Centre; 650, Route Des Lucioles; F-06921 Sophia-Antipolis Cedex; France vol. RAN WG1, No. Spokane, Wa; Jan. 16, 2017-Jan. 20, 2017, Jan. 16, 2017 (Jan. 16, 2017), XP051208315, pp. 1-10.
CATT : "On Codeword-to-layer Mapping", 3GPP TSG WG1 #88, R1-1702069, Athens, Greece Feb. 13-17, 2017, 4 Pages.
CATT: "Interleaver Design for NR Polar Codes", 3GPP TSG RAN WG1 Meeting #90, R1-1714570, Prague, Czechia, Aug. 21-25, 2017, 4 Pages.
CATT: "Interleaver Design for NR Polar Codes", 3GPP TSG RAN WG1 Meeting NR#3, R1-1715835, Nagoya, Japan, Sep. 18-21, 2017, 5 Pages.
ETRI: "On REG interleaving for distributed NR-PDCCH", 3GPP TSG RAN WG1 #89, R1-1708098, Hangzhou, China, May 15-19, 2017, pp. 1-5.
Huawei et al., "On NR-PDCCH Structure" 3GPP TSG RAN WG1 Meeting AH_NR#3, R1-1715394, Nagoya, Japan, Sep. 18-21, 2017, 8 Pages.
Huawei, et al., "Polar Code Interleaver", 3GPP TSG RAN WG1 Meeting #90, R1-1712170, Prague, Czech Republic, Aug. 21-25, 2017, 8 Pages.
Interdigital Inc: "Performance Evaluation of Channel Interleaver" 3GPP TSG RAN WG1 Meeting NR#3, R1-1716489, Nagoya, Japan, Sep. 18-21, 2017, 8 Pages.
NICT: "Interleaved Repetition Transmission for UL Grant-Free Transmission", 3GPP TSG RAN WG1 Meeting NR#3, R1-1715656, Nagoya, Japan, Sep. 18-21, 2017, 4 Pages.
Nokia, et al., "Bit-Interleaving for LDPC", 3GPP TSG RAN WG1 Meeting NR#3, R1-1716556, Nagoya, Japan, Sep. 18-21, 2017, 4 Pages.
NTT Docomo: "Channel Interleaving Design of Polar Codes", 3GPP TSG RAN WG1 Meeting #90, R1-1713968, Prague, Czech Republic, Aug. 21-25, 2017, pp. 1-6.
NTT Docomo: "Interleaving Design of Polar Codes", 3GPP TSG RAN WG1 NR Ad-Hoc#2 R1-1711128, Qingdao, China Jun. 27-30, 2017, pp. 1-6.
QUALCOMM Incorporated: "CW to Layer Mapping", 3GPP TSG RAN WG1 Meeting #88, R1-1702596, Feb. 13-17, 2017, Athens, Greece, pp. 1-7.
QUALCOMM Incorporated: "CW to Layer Mapping and Frequency Domain Interleaving", 3GPP TSG RAN WG1 Meeting #90, R1-1713386, Prague, P.R. Czechia, Aug. 21-25, 2017, pp. 1-16.
QUALCOMM Incorporated: "CW to Layer Mapping and Frequency Domain Interleaving", 3GPP TSG RAN WG1 NR Ad-Hoc#2, R1-1711152, Qingdao, P.R. China Jun. 27-30, 2017, pp. 1-11.
QUALCOMM Incorporated: "Design and Evaluation of Interleaver for Polar codes", 3GPP TSG-RAN RAN1#90, R1-1713474, Aug. 21-25, 2017, pp. 1-11.
QUALCOMM Incorporated: "Frequency Domain Interleaving", 3GPP TSG-RAN WG1 #89, R1-1709200, May 15-19, 2017, Hangzhou, China, pp. 1-10.
ZTE: "Consideration on High Order Modulation and Interleaver for Polar Codes", 3GPP TSG RAN WG1 Meeting #90, R1-1713236, Prague, Czechia, Aug. 21-25, 2017, pp. 1-7.
CATT: "On PDSCH and PUSCH Resource Allocation," 3GPP Draft, 3GPP TSG RAN WG1 Meeting AH 1801, R1-1800257, 3rd Generation Partnership Project (3GPP), Mobile Competence Centre, 650, Route Des Lucioles, F-06921, Sophia-Antipolis Cedex, France, vol. RAN WG1, No. Vancouver, Canada; Jan. 22, 2018-Jan. 26, 2018, Jan. 13, 2018 (Jan. 13, 2018), XP051384735, 23 pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] * the whole document *.
European Search Report—EP20189142—Search Authority—Munich—dated Nov. 3, 2020.
Taiwan Search Report—TW107104926—TIPO—dated Jan. 27, 2021.

* cited by examiner

FLEXIBLE INTERLEAVING FOR WIRELESS COMMUNICATIONS

CROSS REFERENCES

The present Application for Patent is a Continuation of U.S. patent application Ser. No. 15/893,459 by LI et al., entitled "FLEXIBLE INTERLEAVING FOR WIRELESS COMMUNICATIONS" filed Feb. 9, 2018, which claims priority to U.S. Provisional Patent Application No. 62/458,559 by Li et al., entitled "Flexible Interleaving for Wireless Communications," filed Feb. 13, 2017, which is assigned to the assignee hereof and expressly incorporated by reference herein.

BACKGROUND

The following relates generally to wireless communication and more specifically to flexible interleaving for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long-Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

LTE or certain versions of LTE may not, however, contemplate or address interleaving techniques to support widely varying requirements within a communication system. Improved interleaving techniques may support various operations or characteristics to improve communications within a wireless multiple-access system.

SUMMARY

The described techniques relate to improved methods, systems, devices, or apparatuses that support flexible interleaving for wireless communications. Generally, the described techniques provide for flexible frequency or time-domain interleaving in a communications system. In some cases, a configurable interleaver design may enable communication devices to exploit diversity in a given channel (e.g., which may depend on the physical channel conditions, beamforming patterns). Additionally, such a configurable design may enable a device to conserve power and reduce latency (e.g., by disabling interleaving when sufficient diversity is not available, for time-critical transmissions). In some cases, interleaving may be configured (e.g., by a wireless device in a wireless communications system) dynamically or semi-statically using a combination of bit-level, tone-level, or tone-group level interleaving. The flexible configuration may depend on explicit signaling and/or implicit rules.

A method of wireless communications is described. The method may include establishing a communication link over a channel with a UE, determining a tone-group level interleaving configuration for a transmission associated with the UE based at least in part on a deployment characteristic of the channel or a transmission characteristic of the transmission, and transmitting, to the UE, an indication of the tone-group level interleaving configuration.

An apparatus for wireless communications is described. The apparatus may include means for establishing a communication link over a channel with a UE, means for determining a tone-group level interleaving configuration for a transmission associated with the UE based at least in part on a deployment characteristic of the channel or a transmission characteristic of the transmission, and means for transmitting, to the UE, an indication of the tone-group level interleaving configuration.

Another apparatus for wireless communications is described. The apparatus may include a processor, memory in electronic communication with the processor, and instructions stored in the memory. The instructions may be operable to cause the processor to establish a communication link over a channel with a UE, determine a tone-group level interleaving configuration for a transmission associated with the UE based at least in part on a deployment characteristic of the channel or a transmission characteristic of the transmission, and transmit, to the UE, an indication of the tone-group level interleaving configuration.

A non-transitory computer-readable medium for wireless communications is described. The non-transitory computer-readable medium may include instructions operable to cause a processor to establish a communication link over a channel with a UE, determine a tone-group level interleaving configuration for a transmission associated with the UE based at least in part on a deployment characteristic of the channel or a transmission characteristic of the transmission, and transmit, to the UE, an indication of the tone-group level interleaving configuration.

In some examples of the method, apparatus, and non-transitory computer-readable medium described above, determining the tone-group level interleaving configuration comprises: determining to enable or disable tone-group level interleaving for the UE based at least in part on a condition of the channel.

Some examples of the method, apparatus, and non-transitory computer-readable medium described above may further include processes, features, means, or instructions for enabling tone-group level interleaving for the UE. Some examples of the method, apparatus, and non-transitory computer-readable medium described above may further include processes, features, means, or instructions for receiving, from the UE, one or more code blocks via resources of the channel. Some examples of the method, apparatus, and non-transitory computer-readable medium described above may further include processes, features, means, or instructions for de-interleaving the one or more code blocks based at least in part on the tone-group level interleaving configuration.

In some examples of the method, apparatus, and non-transitory computer-readable medium described above, the deployment characteristic comprises a frequency of the channel, a bandwidth of the channel, a subcarrier spacing for the channel, or any combination thereof.

In some examples of the method, apparatus, and non-transitory computer-readable medium described above, the transmission characteristic comprises a resource allocation type, a code block size for the transmission, a modulation and coding scheme (MCS) for the transmission, a number of layers for the transmission, a channel delay spread, a Doppler spread, a signal to noise ratio (SNR) of the channel or any combination thereof.

Some examples of the method, apparatus, and non-transitory computer-readable medium described above may further include processes, features, means, or instructions for receiving a measurement report comprising a set of channel statistics, wherein the transmission characteristic may be based at least in part on the set of channel statistics.

Some examples of the method, apparatus, and non-transitory computer-readable medium described above may further include processes, features, means, or instructions for determining the tone-group level interleaving configuration comprises configuring one of a time domain interleaving pattern or a frequency domain interleaving pattern for the transmission.

In some examples of the method, apparatus, and non-transitory computer-readable medium described above, determining the tone-group level interleaving configuration comprises: determining a number of tones in each group of tones of a tone-group level interleaving pattern for the tone-group level interleaving configuration.

In some examples of the method, apparatus, and non-transitory computer-readable medium described above, the transmission characteristic may be based at least in part on a measurement of an uplink channel condition.

In some examples of the method, apparatus, and non-transitory computer-readable medium described above, the tone-group level interleaving configuration comprises one or both of an intra-code block tone-group level interleaving pattern or an inter-code block tone-group level interleaving pattern.

In some examples of the method, apparatus, and non-transitory computer-readable medium described above, determining the tone-group level interleaving configuration comprises: dynamically or semi-statically configuring tone-group level interleaving for the UE.

In some examples of the method, apparatus, and non-transitory computer-readable medium described above, the indication of the tone-group level interleaving configuration may be transmitted via radio resource control (RRC) signaling.

In some examples of the method, apparatus, and non-transitory computer-readable medium described above, the indication of the tone-group level interleaving configuration may be transmitted via a control message.

DETAILED DESCRIPTION

Figure 1:
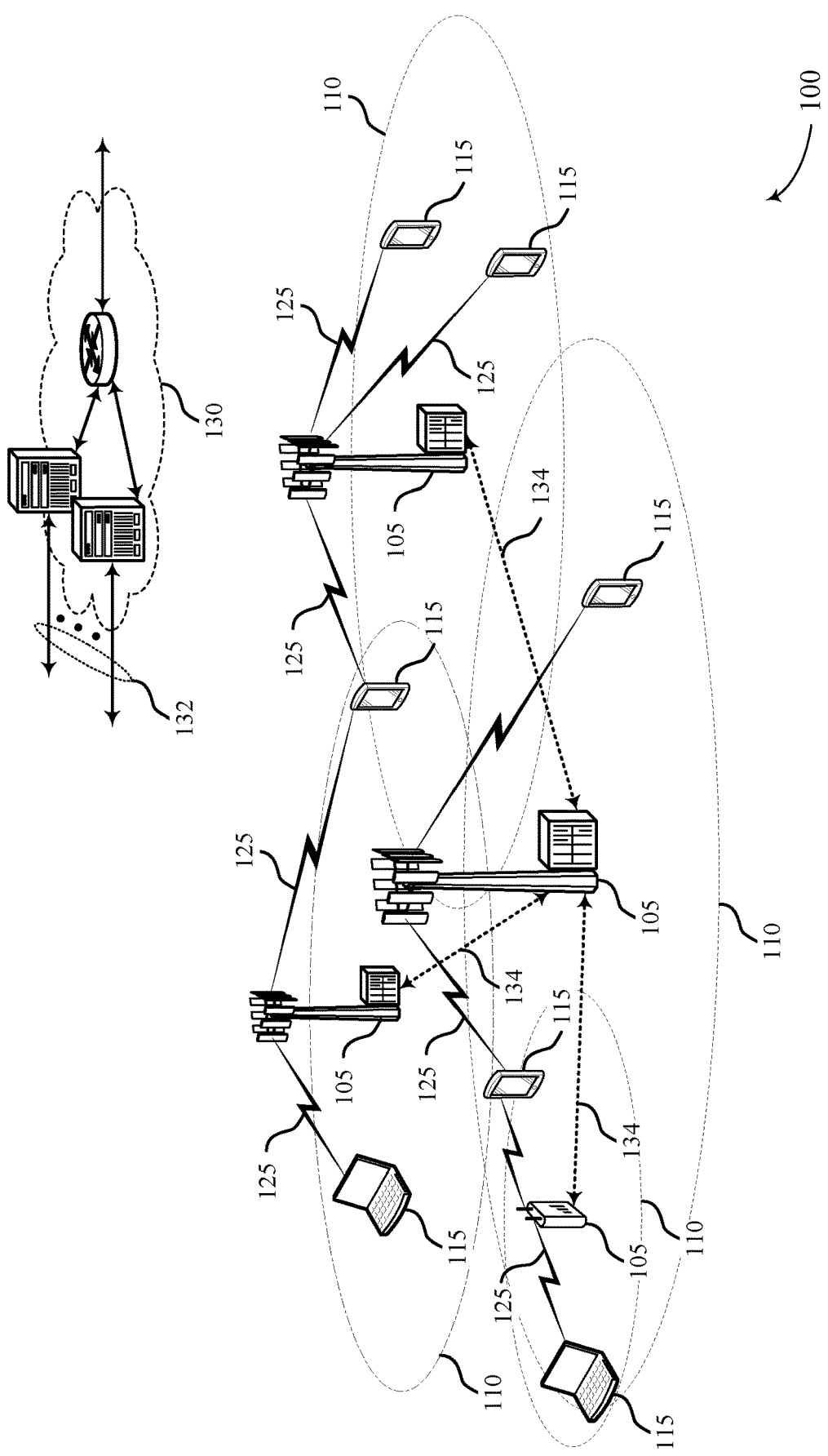
FIG. 1 illustrates an example of a system for wireless communication that supports flexible interleaving for wireless communications in accordance with various aspects of the present disclosure.

Interleaving may be configured dynamically or semi-statically to support various data rates, latency conditions, mobility, reliability, and complexity within a system. Flexible interleaving may include a combination of bit-level, tone-level, tone-group level, or other interleaving technique for one or more transmissions. The interleaving configuration may be based on a deployment characteristic or a transmission characteristic. Deployment characteristics include a frequency of a channel, bandwidth of the channel, or subcarrier spacing. Transmission characteristics may include a delay spread, a coherence bandwidth, a signal to noise ratio, or a Doppler spread, or a combination thereof. An interleaving configuration determination may be made by a base station or some other network entity and explicitly signaled to another device. Additionally or alternatively, the determination may be made based on one or more implicit rules, which may be based on a variety of factors. For example, the factors may include available bandwidth, modulation and coding scheme (MCS), code block (CB) size, number of layers (i.e., rank of the transmission), etc. Interleaving may be enabled or disabled under certain conditions.

By way of example, some wireless communication systems may employ one or more forms of interleaving (e.g., time and/or frequency interleaving). Interleaving may improve performance of the system by exploiting diversity over a frequency-selective channel, diversity over a fast fading channel, interference diversity over frequency and/or time, etc. Some systems (e.g., New Radio (NR) systems) may operate in frequency ranges that may utilize beamformed transmissions between wireless devices.

For example, some frequency ranges (e.g., millimeter wave (mmW)) may be associated with increased signal attenuation (e.g., path loss). As a result, signal processing techniques, such as beamforming, may be used to combine energy coherently and overcome the path losses. However, beamforming may alter the channel conditions experienced by the signal (e.g., may affect the coherence bandwidth of the channel) and improved techniques supporting flexible interleaving based on a wide variety of applications and beamforming characteristics may be desired. The use of a configurable interleaver to provide flexible interleaving may benefit the system. For instance, in some systems (e.g., systems in which the channel conditions may vary based on various parameters), interleaving may be configured (e.g., dynamically or semi-statically) based at least in part on the given communication parameters (e.g., beamforming parameters, signal-to-noise ratio (SNR)).

In some cases, flexible interleaving may refer to dynamically or semi-statically determining a combination of bit-level, tone-level, tone-group level, or any other suitable interleaving technique for one or more transmissions in the system. In some cases, the determination may be made by a base station (e.g., or some other coordinating entity within the network) and explicitly signaled to another device (e.g., a user equipment (UE)). Additionally or alternatively, the determination may be made based on one or more implicit rules, which may be based on a variety of factors (e.g., available bandwidth, MCS, CB size, number of layers, etc.). In some cases, the interleaving may be enabled or disabled under certain conditions (e.g., to conserve energy, to reduce latency, etc.).

Aspects of the disclosure above are described below in the context of a wireless communications system. Further examples are then provided of beam pairs and a resource grid. Aspects of the disclosure are further illustrated by and described with reference to apparatus diagrams, system diagrams, and flowcharts that relate to search candidates in multi-link control channel.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long-Term Evolution (LTE), an LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices. System 100 may support flexible interleaving as described herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions). The control information may be transmitted in the same slot as the data transmission or in a different slot (e.g., when aggregation of control messages for multiple TTIs is used). Base stations 105 and/or UEs may include components for configurable interleaving as described herein.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like. UEs 115 may configure an interleaver, or operate according to dynamically or semi-statically configured interleaving, as described herein.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105. D2D-enabled devices may employ configurable interleaving techniques as described herein.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions. Configurable, flexible interleaving, as described herein, may be employed to support narrowband, MTC, and/or IoT operation within system 100.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4-6 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF), super high frequency (SHF), or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating frequency bands in which signal attenuation is an issue, such as mmW or EHF for example, may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. In some cases, beamforming may also be used at a receiver to collect maximal signal energy from one or more dominant arrival paths and/or to tune out interference. Configurable, flexible interleaving, as described herein, may be employed to complement beamforming.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of a RRC connection between a UE 115 and a base station 105, or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may include one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, a numerology (e.g., symbol duration, frequency spacing) associated with an eCC may vary (e.g., may be scalable) based at least in part on a use case or deployment scenario. For example, when operating in some frequency ranges (e.g., sub-6 GHz), a smaller subcarrier spacing may be adopted which may enable a longer symbol duration and cyclic prefix (CP) duration to combat frequency selective fading. Increasing frequency may result in phase noise becoming a more dominant portion of a signal, and a larger subcarrier spacing may be adopted to help mitigate or prevent phase noise. A scaling numerology may accommodate various applications with different latency requirements and conditions. For example, outdoor operations and indoor operations may have varying or different CP length requirements.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD), or a combination of both.

As described herein, interleaving may be dynamically or semi-statically configured to support different and varied communication needs or constraints within system 100. For example, an interleaving pattern for transmitting coded information may be configured based on a deployment characteristic or a transmission characteristic. Code blocks may be mapped to physical resources of the channel based on the interleaving pattern, and the code blocks may be transmitted on the physical resources of the channel according to the mapping. Or interleaving may be enabled, or disabled, as may be beneficial for certain scenarios or applications.

Figure 2:
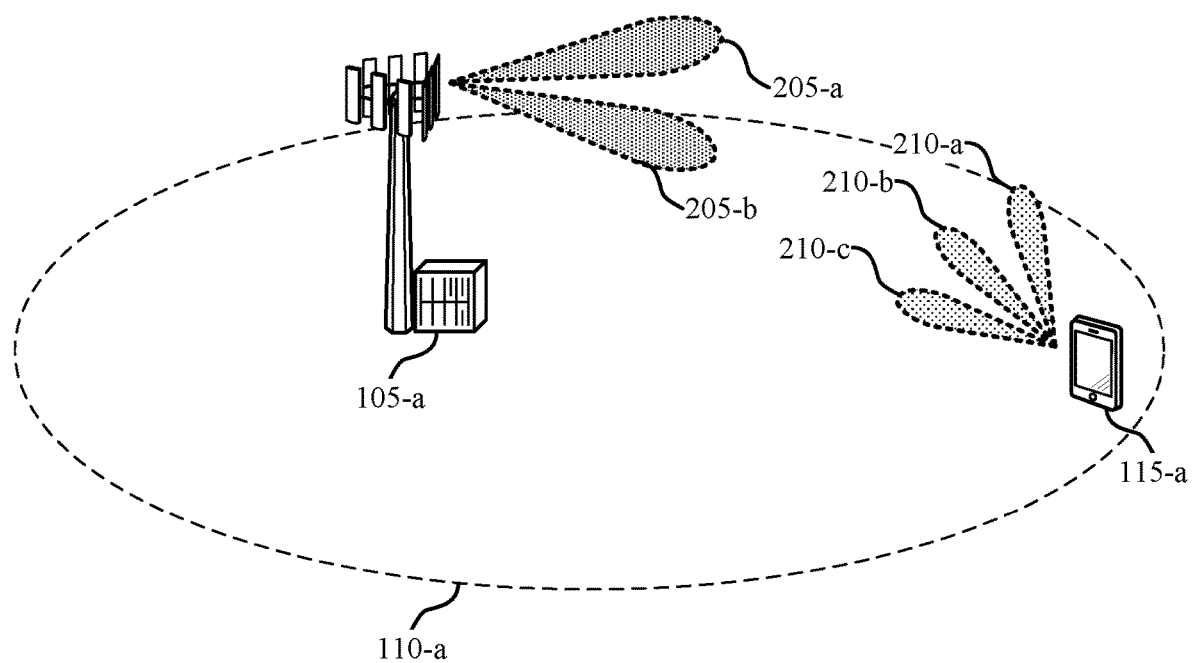
FIG. 2 illustrates an example of a wireless communications system that supports flexible interleaving for wireless communications in accordance with various aspects of the present disclosure.

FIG. 2 illustrates an example of a wireless communications system 200 that supports flexible interleaving for wireless communications in accordance with various aspects of the present disclosure. Wireless communications system 200 may include a base station 105-a and a UE 115-a, each of which may be an example of the corresponding device described with reference to FIG. 1. Aspects of the following examples are described using downlink transmissions, though the techniques may be extended to uplink transmissions without departing from the scope of the present disclosure.

Wireless communications system 200 may operate in frequency ranges that are associated with beamformed transmissions between base station 105-a and UE 115-a. For example, wireless communication system 200 may operate using mmW frequency ranges (e.g., or other frequency ranges associated with signal attenuation as described above with reference to FIG. 1). As a result, signal processing techniques, such as beamforming, may be used to combine energy coherently and overcome path losses.

By way of example, base station 105-a may contain multiple antennas. In some cases, each antenna may transmit a phase-shifted version of a signal such that the phase-shifted versions (e.g., which may be referred to herein as rays) constructively interfere in certain regions and destructively interfere in others. Weights may be applied to the various phase-shifted versions, e.g., in order to steer the transmissions in a desired direction. Such techniques (or similar techniques) may serve to increase the coverage area 110-a of the base station 105-a or otherwise benefit the wireless communications system 200. These techniques may also influence the channel conditions experienced by signals in the wireless communications system 200.

Transmit beams 205-a and 205-b represent examples of beams over which data may be transmitted. Accordingly, each transmit beam 205 may be directed from base station 105-a toward a different region of the coverage area 110-a and in some cases, two or more beams may overlap. Transmit beams 205-a and 205-b may be transmitted simultaneously or at different times. In either case, a UE 115-a may be capable of receiving rays of one or more transmit beams 205 via respective receive beams 210-a, 210-b, and/or 210-c.

In one example, UE 115-a may form one or more receive beams 210-a, 210-b, and 210-c. Similar to base station 105-a, UE 115-a may contain multiple antennas. The receive beams 210-a, 210-b, and 210-c may each receive rays from transmit beams 205-a, 205-b, or some combination thereof. In some cases, the receive beams 210 may receive rays from a single transmit beam 205 (e.g., receive beam 210-a may receive rays of transmit beam 205-a with various pathloss and multipath effects included). That is, multiple antennas of UE 115-*a* may receive the rays of transmit beam 205-*a* which have experienced different path losses or phase shifts (e.g., different phase shifts may be due to the different path lengths between the base station 105-*a* and the respective antennas of the UE 115-*a*) and appropriately combine the received rays into receive beam 210-*a*. A transmit beam 205 and a corresponding receive beam 210 may be referred to as a beam pair link, active beam pair, etc.

In some cases, a single transmit beam 205-*b* may be processed as multiple receive beams 210-*b*, 210-*c*. That is, each receive beam 210-*b*, 210-*c* may represent the transmit beam 205-*b* with respective multipath effects (e.g., based on the beamforming employed to form the respective receive beam 210-*b*, 210-*c*, the physical channel environment between the transmit and respective receive antennas, etc.) included. Such a scheme may be referred to as a receive diversity scheme and may contribute to the successful decoding of the transmit beam 205-*b*.

Alternatively, transmit beams 205-*a*, 205-*b* may carry complementary information such that a single receive beam (e.g., receive beam 210-*b*) may be used to process the combined information. In some examples, complementary information may be transmitted and received over different antenna polarizations (e.g., such that the two polarizations may share the same transmit beams 205 and/or receive beams 210 or may use different beam pairs. In some cases, the transmit beams 205-*a*, 205-*b* may be configured (e.g., independently or in combination) such that one or both exploits the various forms of diversity that may be achieved using interleaving.

Figure 3:
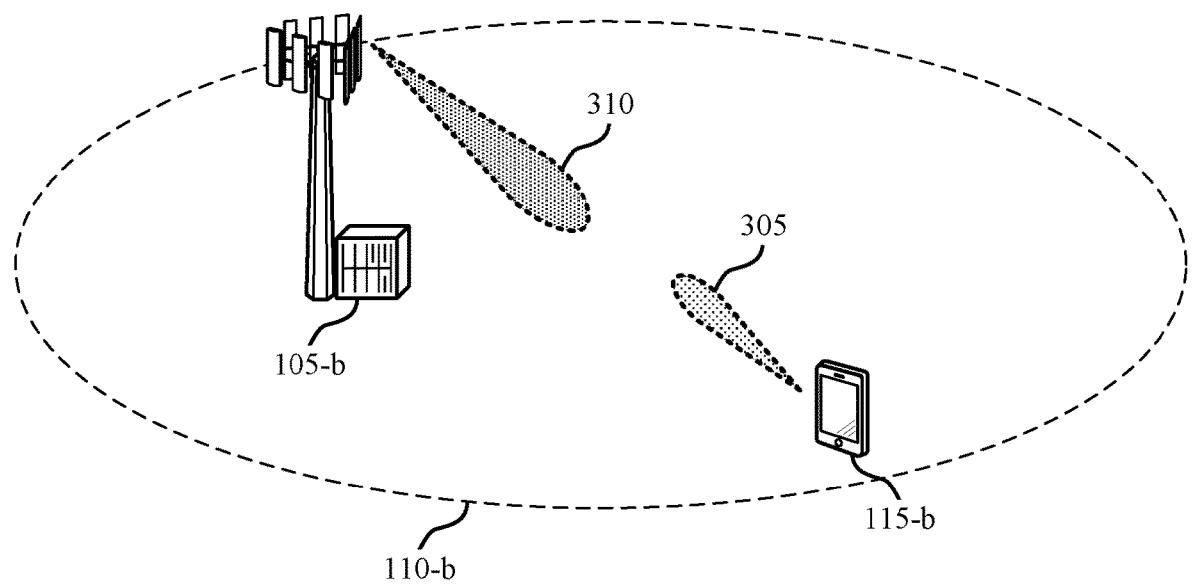
FIG. 3 illustrates an example of a wireless communications system that supports flexible interleaving for wireless communications in accordance with various aspects of the present disclosure.

FIG. 3 illustrates an example of a wireless communications system 300 that supports flexible interleaving for wireless communications in accordance with various aspects of the present disclosure. Wireless communications system 300 includes base station 105-*b* and UE 115-*b*, each of which may be an example of the corresponding devices described with reference to FIGS. 1 and 2.

Wireless communications system 300 illustrates a beamformed transmission 305 originating at UE 115-*b* and a corresponding beamformed reception 310 terminating at base station 105-*b* within a coverage area 110-*b*. Accordingly, aspects of the following examples are described using uplink transmissions, though the techniques may be extended to downlink transmissions (e.g., as described with reference to FIG. 2). Further, it is to be understood that the present example displays a single beam pair (e.g., comprising beamformed transmission 305 and beamformed reception 310) for the sake of simplicity. Additional beam pairs may exist between UE 115-*b* and base station 105-*b*.

Wireless communications system 300 may employ various forms of interleaving to improve system performance. These performance improvements may be the result of exploiting diversity over a frequency-selective channel, diversity over a fast fading channel, interference diversity over frequency, interference diversity over time, etc. Frequency-only interleaving (e.g., intra-CB, inter-CB, tone-level, tone group-level, or bit-level frequency interleaving) may be a useful scheme in achieving frequency diversity with a relatively small latency impact. In some cases, time interleaving may be used in combination with the various frequency interleaving schemes described herein. However, time interleaving may be associated with increased latency because multiple code blocks, symbols, slots, etc. may have to be received and processed before demodulation of a single code block, symbol, slot, etc. may begin, for example.

As used in aspects of the present disclosure, diversity may refer to differences in transmission environments (e.g., different frequency-dependent fading, different path lengths, etc.). Many communication environments are not memoryless, such that errors may tend to occur in groups. As an example, for a communication in which UE 115-*b* is moving, some initial portion of beamformed transmission 305 may be absent from beamformed reception 310 (e.g., due to some transient signal blockage). Additionally or alternatively, some portion of the beamformed transmission 305 associated with a given frequency range may be absent from the beamformed reception 310 (e.g., because of high path-loss within the frequency range, interference with another signal, etc.). Accordingly, such communications may benefit from the use of interleaving, such that the deleterious effects of transmission obstacles similar to those described above may be spread across multiple regions of the communication resources or otherwise mitigated.

Wireless communication system 300 may support applications with varying data rates, latency, mobility, reliability and/or complexity requirements. Accordingly, base station 105-*b* and/or UE 115-*b* may employ aspects of a configurable interleaver as described herein. Such a configurable interleaver may be designed to exploit the diversity in the specific channel as determined by the physical channel conditions as well as various antenna beamforming factors. As an example, different rays of beamformed transmission 305 may experience different physical channel conditions over their respective paths to base station 105-*b*. Additionally or alternatively, the beamforming factors used to form beamformed transmission 305 and/or beamformed reception 310 may influence the available diversity. In some cases, a configurable interleaver may be able to meet specific application requirements and/or conserve power and reduce latency when diversity is not achievable or desirable.

For example, in some applications (e.g., mmW, sub-6 GHz massive MIMO, etc.), the channel frequency and time selectivity of a beamformed communication may depend on a variety of factors including the antenna structure, antenna orientation, and beamforming applied at one or both ends of the communication (e.g., beamforming performed to generate beamformed transmission 305 and/or beamformed reception 310). Additionally or alternatively, the frequency and time selectivity may depend on one or more physical channel characteristics. By way of example, the post-beamforming power of a ray may depend on the antenna element pattern gain as well as the beamforming gain. In some cases, the beamforming gain may depend on one or more transmission parameters (e.g., relative angle of the beam, beamforming weights, etc.) as well as one or more antenna properties (e.g., the boresight of the antenna, the antenna array size, etc.). As an example, the post-beamforming power $\tilde{P}_{n,m}$ of a ray m of cluster n may be determined as:

$$\tilde{P}_{n,m} = \frac{P_n}{M}(G_{rx,m,n}(\theta_{n,m,ZOA}, \phi_{n,m,AOA})G_{tx,m,n}(\theta_{n,m,ZOD}, \phi_{n,m,AOD})$$

$$A_{rx,m,n}(\theta_{n,m,ZOA}, \phi_{n,m,AOA})A_{tx,m,n}(\theta_{n,m,ZOD}, \phi_{n,m,AOD}))^2$$

where $G_{rx,m,n}(\theta_{n,m,ZOA}, \phi_{n,m,AOA})$ and $G_{tx,m,n}(\theta_{n,m,ZOD}, \phi_{n,m,AOD})$ represent reception and transmission antenna array gains, respectively, $A_{rx,m,n}(\theta_{n,m,ZOA}, \phi_{n,m,AOA})$ and $A_{tx,m,n}(\theta_{n,m,ZOD}, \phi_{n,m,AOD})$ represent reception and transmission element pattern gains, respectively, M represents the number of rays (e.g., antenna arrays) in the cluster, $P_n$ represents the cluster power, $(\theta_{n,m,ZOA}, \phi_{n,m,AOA})$ represents the zenith and azimuth, respectively, angles of arrival for ray m of cluster n, and $(\theta_{n,m,ZOD}, \phi_{n,m,AOD})$ represents the zenith and azimuth, respectively, angles of departure for ray m of cluster n.

The post-beamform channel delay spread and Doppler spread may in turn depend on the post-beamforming gain of each ray captured in the respective transmit and receive beams (e.g., in beamformed transmission 305 and beamformed reception 310, respectively). For example, the root mean square (RMS) channel delay spread $\tau_{RMS}$ and Doppler spread $D_s$ may be calculated as:

$$\tau_{RMS} = \sum_{n=1}^{N_{cluster}} \sum_{m=1}^{M} \tilde{P}_{n,m}(\tau_n - \bar{\tau})^2$$

$$D_s = \frac{1}{2}\left( \max_{n,m:\tilde{P}_{n,m} \geq \varepsilon \tilde{P}_{max}} v_{n,m}(\theta_{m,n,ZOA}, \phi_{m,n,ZOD}) - \min_{n,m:\tilde{P}_{n,m} \geq \varepsilon \tilde{P}_{max}} v_{n,m}(\theta_{m,n,ZOA}, \phi_{m,n,ZOD}) \right)$$

$$\text{where } \bar{\tau} = \sum_{n=1}^{N_{cluster}} \sum_{m=1}^{M} \tilde{P}_{n,m}\tau_n, \tilde{P}_{max} = \max_{m,n} \tilde{P}_{n,m},$$

$v_{n,m}$ is the Doppler shift of ray m of cluster n, and ε is a factor smaller than 1.

Channel delay spread may refer to the range of the difference in transmission times required for the various rays of a beamformed transmission 305 to arrive at base station 105-b. The channel delay spread may help determine the coherence bandwidth, as described below. Doppler spread may refer to the range of frequency shifts in the various rays at the receiver. That is, the Doppler frequency shift may vary for different paths such that the frequencies of the respective rays of beamformed transmission 305 will experience different shifts. Accordingly, the beamformed transmission 305 may experience Doppler spreading, which may be characterized by a broadening of the received signal power spectrum of beamformed reception 310. The width of the spectrum may be referred to as the Doppler spread (or fading bandwidth). The Doppler spread may determine the coherence time for a given TTI, which may be considered in selecting among available time-interleaving techniques.

The gain of frequency domain interleaving may depend on a number of factors, including delay spread of the channel, allocated bandwidth, CB size, modulation order signal to noise ratio (SNR), number of layers, etc. With respect to the delay spread, the frequency interleaving gain may depend at least in part on the post-beamforming delay spread. As an example, limited gain may be achieved if the post-beamforming delay spread is relatively small (i.e., if the post-beamforming coherence bandwidth is not considerably smaller than the allocated bandwidth, which may be contiguous or distributed). For example, such a scenario could be the result of the physical channel having a low delay spread (e.g., which may be the result of line of sight (LOS) communication). Additionally or alternatively, beamforming may result in significant reduction of the delay spread (e.g., such that there may be few rays contained in beamformed transmission 305 and/or beamformed reception 310). That is, beamforming may result in a sharp beam and/or a large angle of arrival/angle of departure (AoA/AoD) spread in the underlying channel. Such effects may reduce the available diversity, which may be referred to as flattening of the channel.

As another example, inter-CB frequency interleaving gain may also be limited if the post-beamforming delay spread is relatively large (e.g., if the coherence bandwidth is small relative to the bandwidth occupied by a single CB). In such a scenario, there may be sufficient diversity within a single CB such that the inter-CB frequency interleaving gain may be limited. Inter-CB interleaving may refer to interleaving performed across multiple CBs, while intra-CB interleaving may refer to interleaving performed within a single CB.

In another example, if the aggregated bandwidth of the number of subcarriers for one CB is greater than or equal to the allocated bandwidth, inter-CB frequency interleaving may produce limited (e.g. or no) gain. In such a scenario, a single CB may span more than one symbol, such that the benefits of inter-CB frequency interleaving may be negligible.

As an example, for a relatively large CB (e.g., 6000 bits) and a relatively small full band allocation (e.g., 100 MHz), the use of lower MCS (e.g., quadrature phase shift keying (QPSK) or 16 quadrature amplitude modulation (QAM)) may cause the CB to span more than one symbol, such that there may be no inter-CB frequency interleaving gain. However, the use of higher MCS (e.g., 64 QAM or 256 QAM) may cause the CB to span less than one symbol, such that a given symbol may contain more than one CB. Accordingly, for such a system, frequency interleaving gain may be achieved for some transmissions with a high enough operating SNR that a higher MCS may be used. Alternatively, if one or more parameters in the above example change (e.g., smaller CB size, wider bandwidth, smaller subcarrier spacing, larger number of layers (e.g., streams)), a single symbol may contain more than one CB even for lower MCS (e.g., QPSK), such that frequency interleaving gain may be achieved in more SNR conditions (e.g., as compared to the first example).

Figure 4:
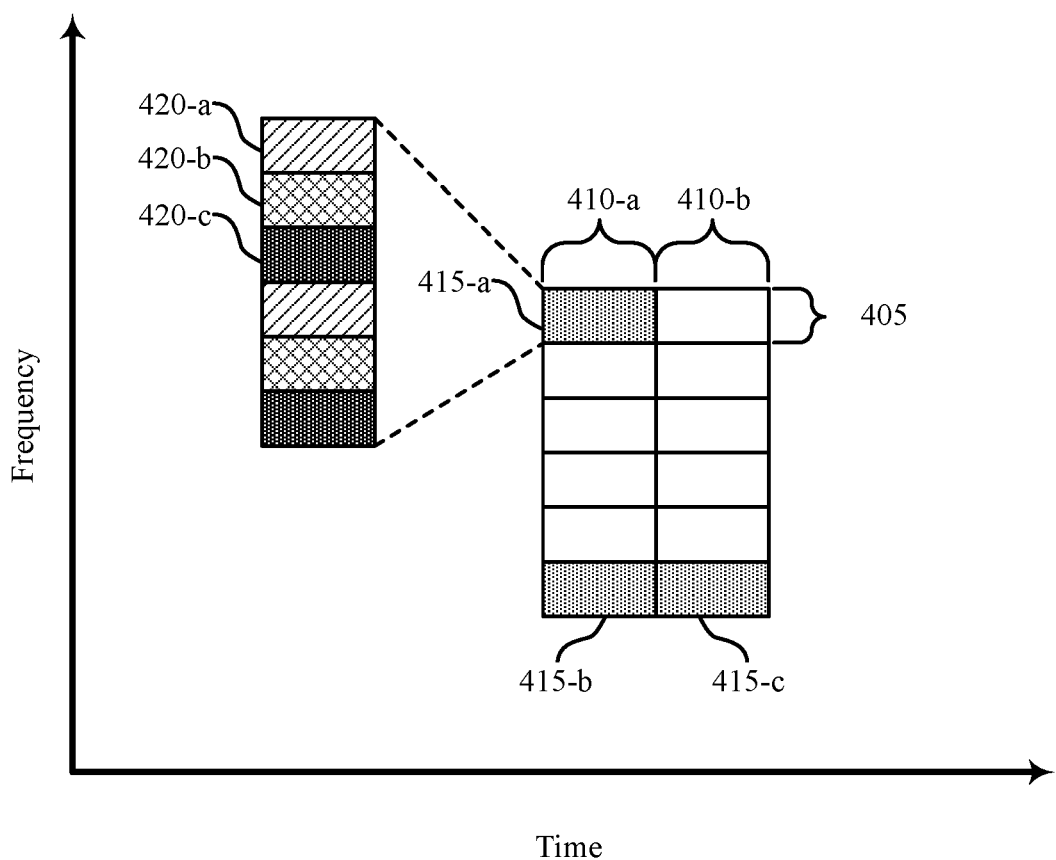
FIG. 4 illustrates an example of a resource grid that supports flexible interleaving for wireless communications in accordance with various aspects of the present disclosure.

FIG. 4 illustrates an example of a resource grid 400 that supports flexible interleaving for wireless communications in accordance with various aspects of the present disclosure. Resource grid 400 may illustrate example resource allocations at a base station 105 or UE 115 as described above with reference to FIGS. 1 through 3. Additionally, aspects of resource grid 400 may be applicable to both downlink and uplink transmissions.

Resource grid 400 is segmented in time and frequency. Multiple segmentations may be possible, such that various time and frequency subdivisions may be used in different examples. In one example, resource grid 400 is segmented into tone groups 405 in the frequency domain and symbols 410 (or symbol periods) in the time domain. Symbols 410 may alternatively represent slots, subframes, varying or variable length TTIs, or some other suitable time division. For an uplink transmission, a UE 115 may be allocated with dedicated resources 415, which may span one or more symbols 410 and contain one or more tone groups 405. These dedicated resources may be adjacent (e.g., contiguous) in frequency or non-contiguous (e.g., as illustrated with respect to dedicated resources 415-a and 415-b). Each tone group 405 may contain one or more tones 420. Each tone 420-a, 420-b, and 420-c may carry information from a respective CB. In some examples, multiple tones 420 within a given set of dedicated resources 415 may carry the same CB. The interleaving of symbols onto tones 420-a, 420-b, 420-c, etc. after modulation and layer mapping may be referred to as tone-level interleaving. In some cases, bit-level interleaving may be used (e.g., in which interleaving is performed before modulation and layer mapping). Additionally or alternatively, CBs may be allocated across respective dedicated resources 415-*a*, 415-*b* (e.g., or otherwise distributed in frequency) within a given symbol 410. The interleaving of tone groups 405 may be referred to as tone-group level interleaving. In some cases, progressively increasing diversity may be achievable using tone-group level interleaving, tone-level interleaving, and bit-level interleaving, respectively. In some cases, interleaver parameters (e.g., row-column size) may vary based on one or more communication parameters (e.g., MCS, latency conditions, path loss, etc.). In some cases, the size of the tone group 405 (i.e., the number of tones 420 within a tone group 405) may vary based on one or more communication parameters (e.g., MCS, latency conditions, path loss, etc.). Although not explicitly illustrated, tones in one group may belong to the same CB. Tone-level interleaving may thus be employed independently from and instead of tone-group level interleaving. Accordingly, a configurable interleaver as described herein may be able to dynamically or semi-statically determine an appropriately sized tone group 405. That is, the group size of a tone group 405 may depend on the coherent bandwidth relative to the subcarrier spacing (e.g., such that a smaller size of a tone group 405 may be used for channels with smaller coherent bandwidths).

As described above, in some situations, a UE 115 or base station 105 may determine an interleaving technique (e.g., which technique to use, whether to use interleaving, by balancing the achievable gain with frequency interleaving against the increased energy consumption and latency that may be introduced by the selected interleaving technique. As further described above with reference to FIG. 3, the gain of frequency interleaving may depend on a number of factors including the post-beamforming delay spread of the channel (e.g., which may determine the coherence bandwidth), the allocation bandwidth, the CB size, the modulation order, and the number of layers, among other possible factors.

As an example, the benefits of an inter-CB frequency interleaving technique may increase when the coherence bandwidth of the channel is smaller than the allocated bandwidth (e.g., up to the point where the coherence bandwidth is considerably (i.e., one order of magnitude) smaller than the bandwidth occupied by one CB). In some cases, the allocated bandwidth may refer to the bandwidth between the lowest tone in the frequency range and the highest tone. As an example, for the first symbol 410-*a*, the allocated bandwidth may refer to the bandwidth between the low end of dedicated resources 415-*b* and the high end of dedicated resources 415-*a*. That is, because the tones 420 in the respective dedicated resources 415-*a*, 415-*b* may be separated in frequency, additional diversity may be achievable such that the allocated bandwidth may be considered to be larger than the aggregated bandwidths of dedicated resources 415-*a* and 415-*b*. When the coherence bandwidth is smaller than the bandwidth occupied by a single CB (e.g., by an order of magnitude), there may be sufficient diversity within one CB (e.g., using intra-CB interleaving) such that the inter-CB frequency interleaving gain may be limited or non-existent.

In some cases, inter-CB frequency interleaving may be applicable when multiple CBs are contained within a single symbol 410. Accordingly, when the bandwidth associated with one CB is greater than the allocated bandwidth, inter-CB interleaving may not be beneficial (e.g., because a single CB may span multiple symbols 410). For example, such a CB may be transmitted over dedicated resources 415-*b*, 415-*c* (e.g., such that time-interleaving may be employed but frequency interleaving within a symbol may not provide any benefits).

As described above, the number of CBs carried in a single symbol 410 depends on the allocated bandwidth. Other factors influencing the number of CBs that may be carried within a symbol 410 may include the size of the CB (e.g., such that a greater number of smaller CBs may be carried), the modulation order (e.g., such that using a higher MCS to condense the size of the encoded CB may increase the number of CBs that may be carried), and the number of layers (e.g., such that more layers may enable a proportionate increase in the number of CBs that may be carried). In some cases, for CBs of the same size, a higher modulation may be associated with a higher interleaving gain. However, if the CB is too large, there may be no interleaving gain even for high MCS.

Accordingly, based on some combination of the various factors described herein, a base station 105 may dynamically or semi-statically configure UEs 115 to interleave data using bit-level interleaving, tone-level interleaving, tone-group level interleaving, or some combination thereof in an inter-CB or intra-CB interleaving process. For example, tone-group interleaving may be configured semi-statically, while bit-level interleaving may be configured dynamically (e.g., based on MCS). In aspects, the dynamic configuration may include explicit signaling (e.g., over the physical downlink control channel (PDCCH)). This signaling may be performed at the slot level or the aggregated slot level (e.g., such that multiple symbols 410-*a* and 410-*b*, which may represent slots in the present example, may be configured in the same PDCCH). Additionally or alternatively, the dynamic configuration may be determined using one or more implicit rules, which may in turn be based on the CB size, MCS, number of layers, number of allocated resource blocks, resource allocation type (e.g., continuous or distributed), component carrier bandwidth, post-beamforming frequency selectivity (e.g., which may be based on uplink (UL) and/or downlink (DL) measurements), etc. That is, a UE 115 may perform measurements on the downlink and report these measurements on the uplink to allow a base station 105 to configure an appropriate interleaving technique. Additionally or alternatively, the base station 105 may configure the appropriate interleaving technique using uplink measurements (e.g., may assume that reciprocal channel conditions exist). As an example, based on an interleaving configuration that may change dynamically based at least in part on an MCS, a UE 115 may determine to enable bit-level intra-CB interleaving, tone-group level interleaving, and/or tone-level inter-CB interleaving. The bit-level intra-CB interleaving, tone-group level interleaving, and/or tone-level inter-CB interleaving may be performed with a row-column interleaver (e.g., bit or tone level data written into the interleaver in rows and read out in columns). In such a case, the row-column size of the bit-level intra-CB interleaver or tone-level inter-CB interleaver may be based at least in part on the MCS. For example, a first row-column size may be selected for a first set of MCS values and a second row-column size may be selected for a second set of MCS values. As described above, time-domain interleaving may be configured for channels with a high Doppler spread, large TTI, and relaxed latency requirements. Additionally or alternatively, time-domain interleaving may be configured to combat burst interference of transmissions that are multiplexed in time.

In some examples, the semi-static configuration may be achieved through RRC signaling (e.g., and/or activation/deactivation of semi-persistent scheduling (SPS) type). For example, frequency interleaving may be disabled if the CC bandwidth is relatively small with respect to the typical coherent bandwidth seen by the system. In some cases, frequency interleaving may be disabled for mission-critical traffic with strict latency standards and/or for small allocation applications (e.g., applications in which distributed allocation of resources may achieve sufficient diversity).

Figure 5:
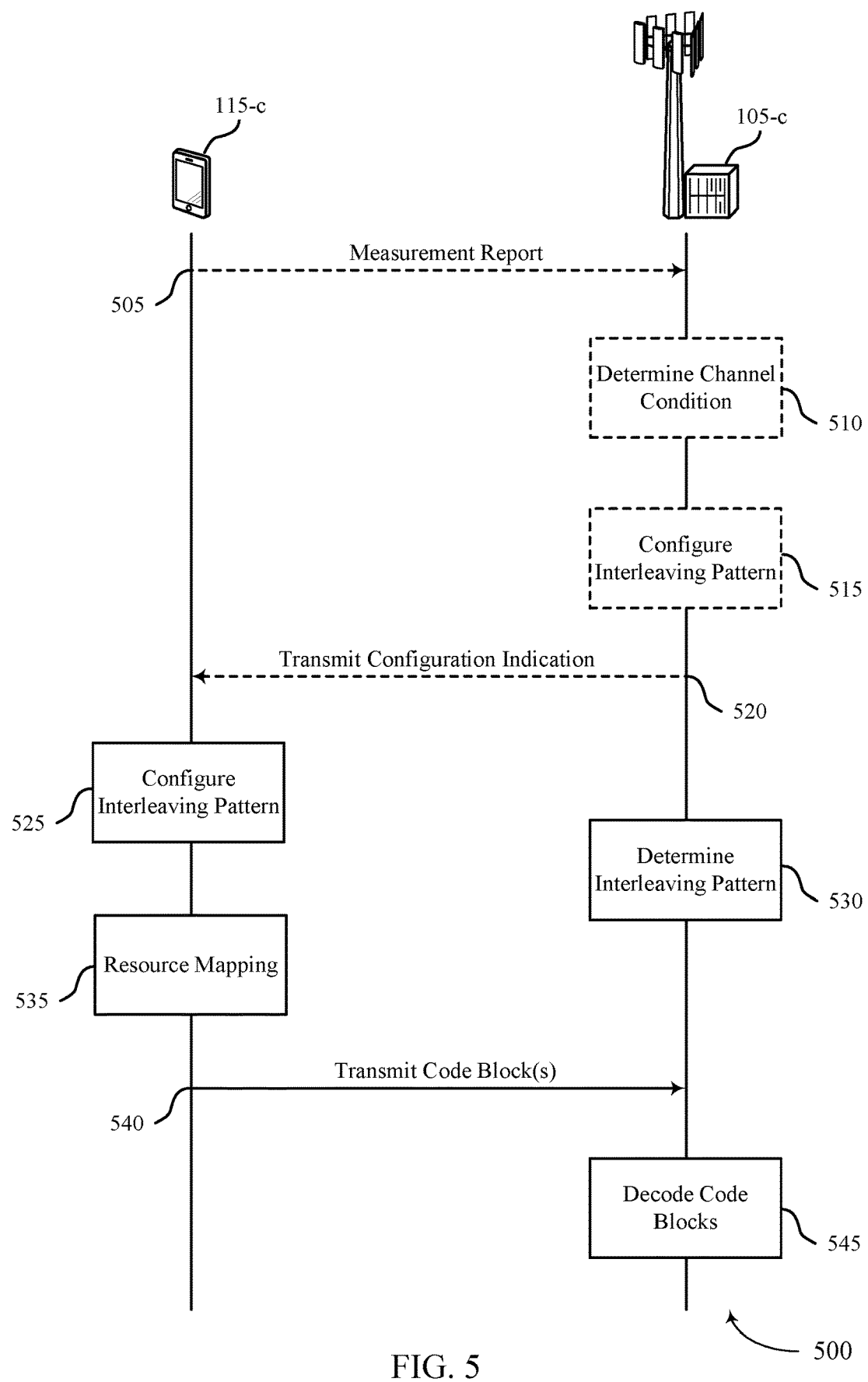
FIG. 5 illustrates an example of a process flow that supports flexible interleaving for wireless communications in accordance with various aspects of the present disclosure.

FIG. 5 illustrates an example of a process flow 500 that supports flexible interleaving for wireless communications in accordance with various aspects of the present disclosure. Process flow 500 includes a UE 115-c and a base station 105-c, each of which may be an example of the corresponding devices described above with reference to FIGS. 1 through 3. Aspects of the following example are described in the context of an uplink transmission, though the described techniques may be applicable to downlink transmissions as well. For example, if a UE 115-c measures the DL channel and sends a measurement report, then the interleaver may be used for DL transmission, and such configuration may be explicitly signaled to UE 115-c or UE 115-c may derive it from implicit rules. In some cases, the channel condition can alternatively be obtained from UL measurement under reciprocal channel conditions. Or if base station 105-c measures the UL channel, it can signal to UE 115-c what interleaver pattern to use on UL transmission or UE 115-c may derive the pattern through implicit rules. Accordingly, some techniques described as being performed at UE 115-c or base station 105-c may instead (or additionally) be performed at the other device without departing from the scope of the disclosure.

At 505, UE 115-c may measure a channel condition for communication with the base station 105-c and optionally transmit a measurement report to base station 105-c. In some cases, the measurement report may indicate at least one of a delay spread, a coherence bandwidth, an SNR, a Doppler spread, or any combination thereof associated with the channel. In some examples, the measurement report may be based on downlink signal measurements performed by UE 115-c.

At 510, base station 105-c (e.g., and/or the UE 115-c) may optionally determine the condition of the channel used for communicating between the devices. In some cases, the condition of the channel may be determined based on the measurement report transmitted at 505. Additionally or alternatively, the condition of the channel may be determined based on one or more measurements of an uplink channel condition. In some examples, determining the condition of the channel may include determining at least one of a delay spread, a coherence bandwidth, an SNR, a measurement of an uplink channel condition, a Doppler spread, or any combination thereof associated with the channel.

At 515, base station 105-c may optionally configure one or more aspects of an interleaving pattern for transmitting coded information over the channel. The configuring may be based at least in part on a deployment characteristic associated with the channel or a transmission characteristic for a transmission associated with the UE 115-c. At 520, base station 105-c may optionally transmit an indication of the interleaving pattern via a control message and/or via RRC signaling. In some cases, these transmissions may be associated with dynamically and semi-statically configuring the interleaving pattern, respectively. Additionally or alternatively, UE 115-c may transmit a configuration indication to base station 105-c.

At 525, UE 115-c may configure an interleaving pattern for transmitting coded information over the channel. The interleaving pattern may be based on one or more of a condition of the channel, a resource allocation, a latency condition, or any combination thereof. In some cases, configuring the interleaving pattern may include determining a group size for a tone-group level interleaving pattern. Additionally or alternatively, configuring the interleaving pattern may include configuring a time domain interleaving pattern and/or a frequency domain interleaving pattern based on at least one of an allocation bandwidth of the channel, a resource allocation type, a size of the one or more CBs, an MCS of the channel, a number of layers, a channel delay spread, a Doppler spread, a subcarrier spacing, or an SNR of the channel (e.g., or any combination thereof). In some cases, configuring the interleaving pattern may include dynamically or semi-statically configuring the interleaving pattern. In some examples, the interleaving pattern may include at least one of an intra-CB bit level interleaving pattern, intra-CB tone level interleaving pattern, intra-CB tone-group level interleaving pattern, inter-CB bit level interleaving pattern, inter-CB tone level interleaving pattern, inter-CB tone-group level interleaving pattern, or any combination thereof. In some cases, interleaver parameters (e.g., row-column size) may vary based on one or more communication parameters (e.g., MCS, latency conditions, path loss, etc.). In some cases, configuring the interleaving pattern may include enabling or disabling interleaving. In some examples, the interleaving pattern may be configured based at least in part on the configuration indication transmitted at 520. For example, UE 115-c may configure an interleaving pattern at 525 based on one or more implicit rules associated with the channel condition. In some cases, the implicit rules may complement the indication of the interleaving pattern transmitted at 520.

At 530, base station 105-c may determine an interleaving pattern for receiving coded information via a channel based on at least one of a condition of the channel, a resource allocation, a latency condition, an indication of the interleaving pattern, or any combination thereof. Aspects of the functions performed at 530 may additionally or alternatively be performed at 515, as described above, and conveyed to UE 115-c in the configuration indication transmitted at 520. In some cases, the interleaving pattern may depend on the channel condition determined at 510. In some cases, determining the interleaving pattern may include determining a group size for a tone-group level interleaving pattern. In some cases, interleaver parameters (e.g., row-column size) may vary based on one or more communication parameters (e.g., MCS, latency conditions, path loss, etc.). In some examples, determining the interleaving pattern may be based at least in part on receiving an indication of the interleaving pattern via a control message or RRC signaling (e.g., as described with reference to 520).

At 535, UE 115-c may map one or more CBs to physical resources of the channel based at least in part on the interleaving pattern configured at 525. In some cases, mapping the one or more CBs may be based at least in part on the group size (e.g., which may be determined at 525).

At 540, UE 115-c may transmit (e.g., and base station 105-c may receive) the one or more CBs on the physical resources of the channel according to the mapping performed at 535.

At 545, the base station 105-c may decode one or more CBs of the coded information received at 540 based on the interleaving pattern determined at 515 and/or 530. In some cases, the decoding may be based at least in part on the group size (e.g., which may be determined at 515 and/or 530). As described with reference to 525, determining the interleaving pattern may include determining a time domain interleaving pattern and/or a frequency domain interleaving pattern based on at least one of an allocation bandwidth of the channel, a resource allocation type, a size of the one or more CBs, an MCS of the channel, a number of layers, a channel delay spread, a Doppler spread, a subcarrier spacing, or an SNR of the channel (e.g., or any combination thereof). In some examples, the interleaving pattern may include at least one of an intra-CB bit level interleaving pattern, intra-CB tone level interleaving pattern, intra-CB tone-group level interleaving pattern, inter-CB bit level interleaving pattern, inter-CB tone level interleaving pattern, inter-CB tone-group level interleaving pattern, or any combination thereof. In some cases, configuring the interleaving pattern may include enabling or disabling interleaving.

Figure 6:
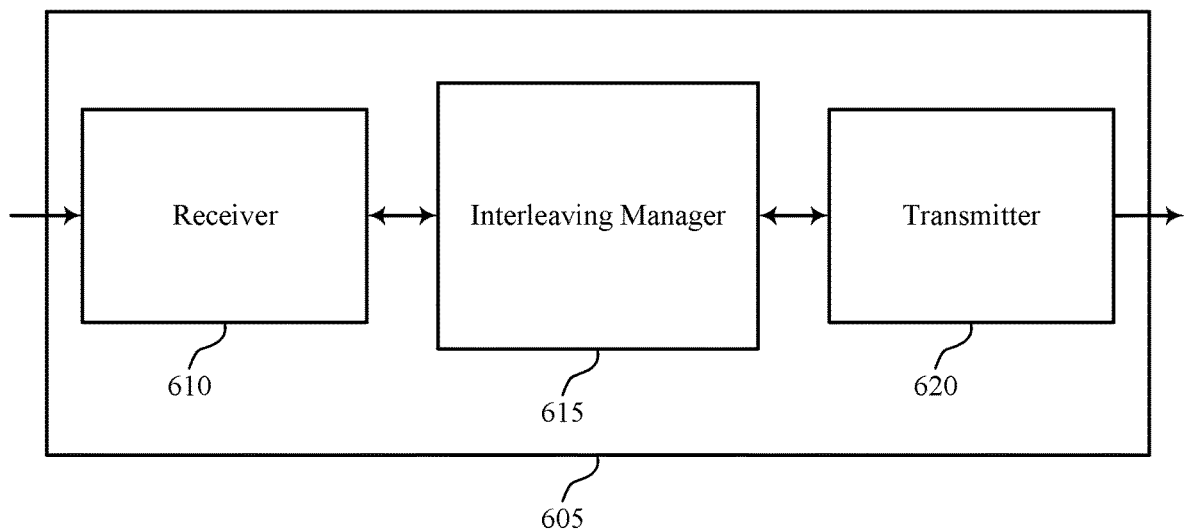
FIGS. 6 through 8 show block diagrams of a device that supports flexible interleaving for wireless communications in accordance with various aspects of the present disclosure.

FIG. 6 shows a block diagram 600 of a wireless device 605 that supports flexible interleaving for wireless communications in accordance with various aspects of the present disclosure. Wireless device 605 may be an example of aspects of a UE 115 and/or base station 105 as described with reference to FIGS. 1-3 and 5. Wireless device 605 may include receiver 610, interleaving manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to flexible interleaving for wireless communications, etc.). Information may be passed on to other components of the device. The receiver 610 may be an example of aspects of the transceiver 935 described with reference to FIG. 9.

Interleaving manager 615 may be an example of aspects of the interleaving manager 915 described with reference to FIG. 9. Interleaving manager 615 and/or at least some of its various sub-components may be implemented in hardware, software executed by a processor, firmware, or any combination thereof. If implemented in software executed by a processor, the functions of the interleaving manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The interleaving manager 615 and/or at least some of its various sub-components may be physically located at various positions, including being distributed such that portions of functions are implemented at different physical locations by one or more physical devices. In some examples, interleaving manager 615 and/or at least some of its various sub-components may be a separate and distinct component in accordance with various aspects of the present disclosure. In other examples, interleaving manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Interleaving manager 615 may configure an interleaving pattern for transmitting coded information via a channel based on at least one of a deployment characteristic of the channel or a transmission characteristic of the transmission, map one or more CBs to physical resources of the channel based on the interleaving pattern, and transmit the one or more CBs on the physical resources of the channel according to the mapping. The interleaving manager 615 may also determine an interleaving pattern for receiving coded information via a channel based on at least one of a deployment characteristic of the channel or a transmission characteristic of the transmission, receive the coded information via the channel, and decode one or more CBs of the coded information based on the interleaving pattern. The interleaving manager 615 may also receive, from a UE, a measurement report that indicates a condition of a channel for the UE, determine a tone-group level interleaving configuration for the UE based at least in part on the deployment characteristic of the channel or the transmission characteristic of the transmission, and transmit, to the UE, an indication of the tone-group level interleaving configuration. The deployment characteristic may include a frequency of the channel, a bandwidth of the channel, a subcarrier spacing for the channel, or any combination thereof. The transmission characteristic may include a resource allocation type, a code block size for the transmission, a modulation and coding scheme (MCS) for the transmission, a number of layers for the transmission, a channel delay spread, a Doppler spread, a signal to noise ratio of the channel or any combination thereof.

The interleaving manager 615 may also establish a communication link over a channel with a UE, determine a tone-group level interleaving configuration for a transmission associated with the UE based at least in part on a deployment characteristic of the channel or a transmission characteristic of the transmission, and transmit, to the UE, an indication of the tone-group level interleaving configuration.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
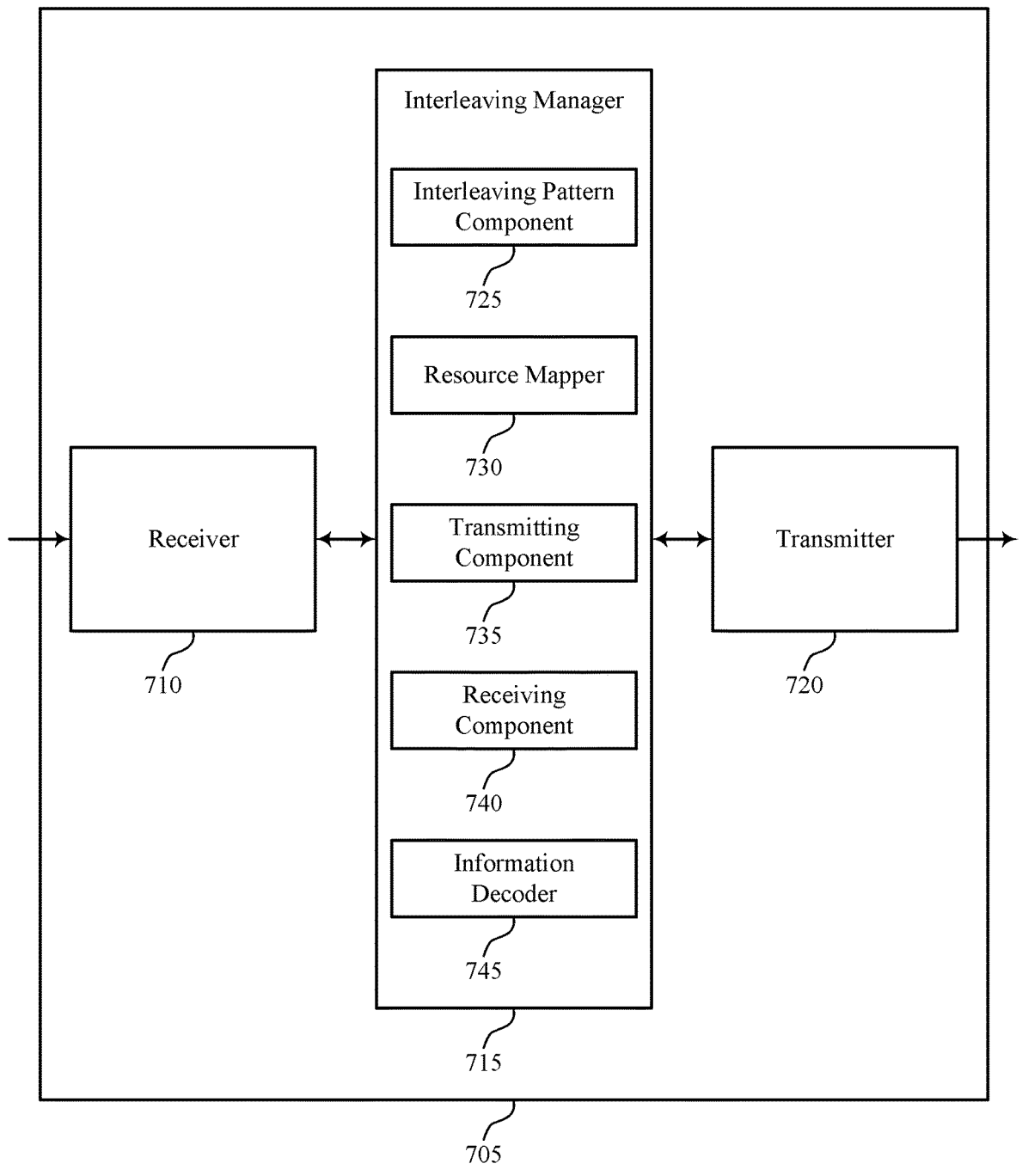

FIG. 7 shows a block diagram 700 of a wireless device 705 that supports flexible interleaving for wireless communications in accordance with various aspects of the present disclosure. Wireless device 705 may be an example of aspects of a wireless device 605 or a UE 115 and/or base station 105 as described with reference to FIGS. 1-3, 5, and 6. Wireless device 705 may include receiver 710, interleaving manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to flexible interleaving for wireless communications, etc.). Information may be passed on to other components of the device. The receiver 710 may be an example of aspects of the transceiver 935 described with reference to FIG. 9.

Interleaving manager 715 may be an example of aspects of the interleaving manager 915 described with reference to FIG. 9. Interleaving manager 715 may also include interleaving pattern component 725, resource mapper 730, transmitting component 735, receiving component 740, and information decoder 745.

Interleaving pattern component 725 may configure an interleaving pattern for transmitting coded information via a channel based on at least one of a deployment characteristic of the channel or a transmission characteristic of the transmission and enable or disable the configuring of the interleaving pattern, where mapping the one or more code blocks may be based on the enabling or disabling. Interleaving pattern component 725 may determine an interleaving pattern for receiving coded information via a channel based on at least one of a deployment characteristic of the channel or a transmission characteristic of the transmission.

In some cases, configuring the interleaving pattern may include: determining a group size for a tone-group level interleaving pattern, where mapping one or more code blocks may be based on the group size. In some examples, configuring the interleaving pattern may include: configuring one of a time domain interleaving pattern or a frequency domain interleaving pattern based on a deployment characteristic of the channel or a transmission characteristic of the transmission. In some instances, configuring the interleaving pattern may include: dynamically or semi-statically configuring the interleaving pattern. In some aspects, the interleaving pattern may include at least one of an intra-code block bit level interleaving pattern, intra-code block tone level interleaving pattern, intra-code block tone-group level interleaving pattern, an inter-code block bit level interleaving pattern, an inter-code block tone level interleaving pattern, an inter-code block tone-group level interleaving pattern, or any combination thereof.

In some cases, determining the interleaving pattern may include: determining a group size for a tone-group level interleaving pattern, where decoding the one or more code blocks may be based on the group size. In some examples, determining the interleaving pattern may include: determining one of a time domain interleaving pattern or a frequency domain interleaving pattern based on a deployment characteristic of the channel or a transmission characteristic of the transmission. In some instances, the interleaving pattern may include at least one of an intra-code block bit level interleaving pattern, intra-code block tone level interleaving pattern, intra-code block tone-group level interleaving pattern, an inter-code block bit level interleaving pattern, an inter-code block tone level interleaving pattern, an inter-code block tone-group level interleaving pattern, or any combination thereof.

Resource mapper 730 may map one or more code blocks to physical resources of the channel based on the interleaving pattern.

Transmitting component 735 may transmit the one or more code blocks on the physical resources of the channel according to the mapping, transmit an indication of the interleaving pattern via a control message, and transmit an indication of the interleaving pattern via RRC signaling.

Receiving component 740 may receive the coded information via the channel, receive the indication of the interleaving pattern via a control message or RRC signaling, and receive an indication of enabling or disabling the interleaving pattern, where decoding the one or more code blocks may be based on the enabling or disabling. Receiving component 740 may receive, from a UE, a measurement report that indicates a set of channel statistics, wherein the set of channel statistics is associated with one or more of a channel quality, a signal-to-noise ratio, a delay spread, or Doppler spread. The transmission characteristic may be based at least in part on the set of channel statistics. Receiving component 740 may receive, from the UE, one or more code blocks via resources of the channel.

Interleaving pattern component 725 may determine a tone-group level interleaving configuration for the UE based at least in part on the condition of the channel. In some cases, determining a tone-group level interleaving configuration may include: determining to enable or disable tone-group level interleaving for the UE based at least in part on a deployment characteristic of the channel or a transmission characteristic of the transmission. Interleaving pattern component 725 may enable tone-group level interleaving for the UE. In some examples, determining a tone-group level interleaving configuration may include: configuring one of a time domain interleaving pattern or a frequency domain interleaving pattern based at least in part on a deployment characteristic of the channel or a transmission characteristic of the transmission. In some aspects, determining a tone-group level interleaving configuration may include: determining a group size for each group of tones of a tone-group level interleaving pattern for the tone-group level interleaving configuration. In some examples, the group size is based at least in part on a number of tones in each group of tones. In some instances, the tone-group level interleaving configuration may include one or both of an intra-code block tone-group level interleaving pattern or an inter-code block tone-group level interleaving pattern. In some cases, determining a tone-group level interleaving configuration may include dynamically or semi-statically configuring tone-group level interleaving for the UE.

Information decoder 745 may decode one or more code blocks of the coded information based on the interleaving pattern. Information decoder 745 may de-interleave the one or more code blocks based at least in part on the tone-group level interleaving configuration.

Transmitting component 735 may transmit, to the UE, an indication of the tone-group level interleaving configuration. In some cases, the indication of the tone-group level interleaving configuration is transmitted via RRC signaling. In some examples, the indication of the tone-group level interleaving configuration is transmitted via a control message.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
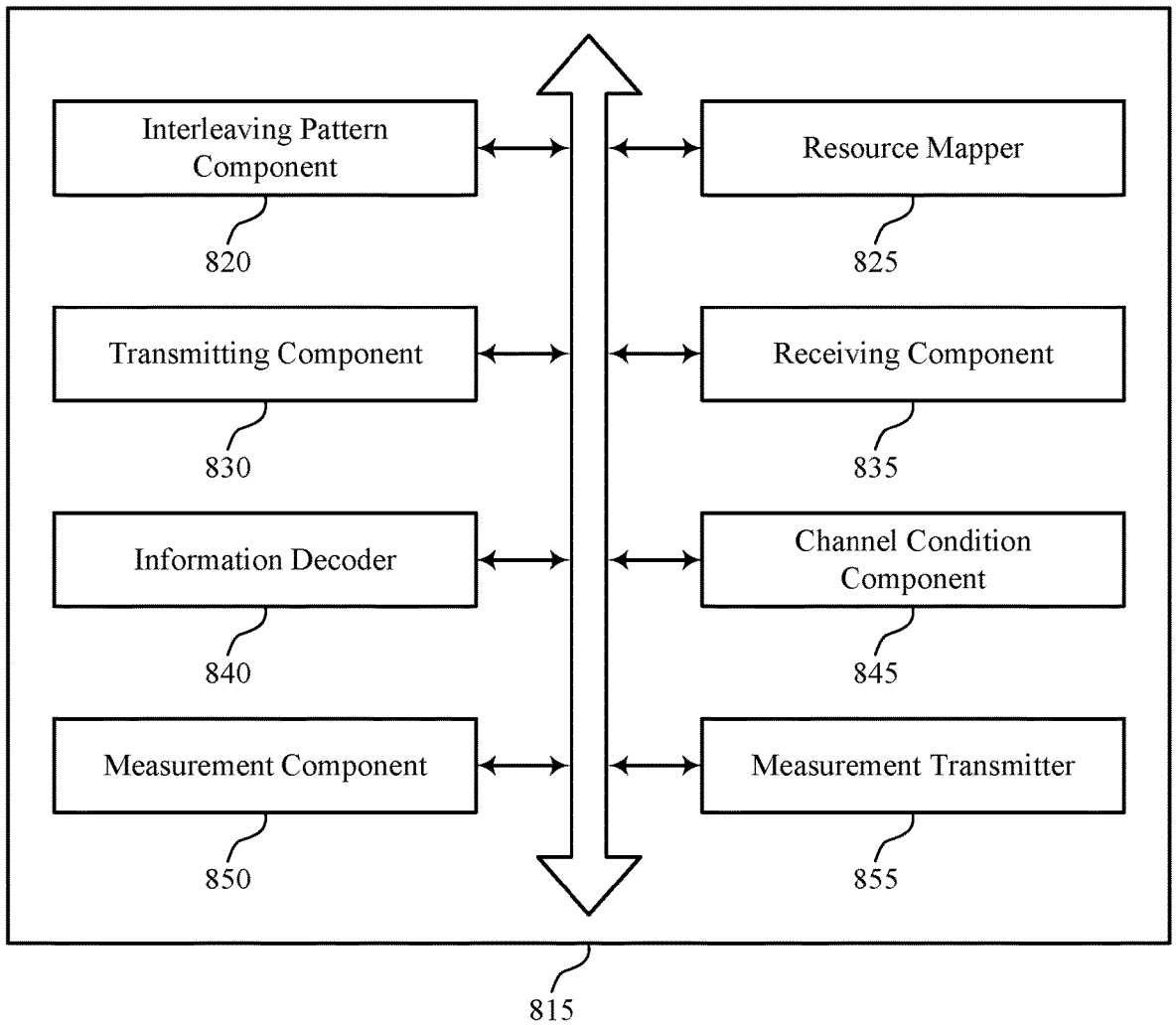

FIG. 8 shows a block diagram 800 of an interleaving manager 815 that supports flexible interleaving for wireless communications in accordance with various aspects of the present disclosure. The interleaving manager 815 may be an example of aspects of a interleaving manager 615, a interleaving manager 715, or a interleaving manager 915 described with reference to FIGS. 6, 7, and 9. The interleaving manager 815 may include interleaving pattern component 820, resource mapper 825, transmitting component 830, receiving component 835, information decoder 840, channel condition component 845, measurement component 850, and measurement transmitter 855. Each of these modules may communicate, directly or indirectly, with one another (e.g., via one or more buses).

Interleaving pattern component 820 may configure an interleaving pattern for transmitting coded information via a channel based on at least one of a deployment characteristic of the channel or a transmission characteristic of the transmission and enable or disable the configuring of the interleaving pattern, where mapping the one or more code blocks may be based on the enabling or disabling. Interleaving pattern component 820 may determine an interleaving pattern for receiving coded information via a channel based on at least one of a deployment characteristic of the channel or a transmission characteristic of the transmission. In some cases, configuring the interleaving pattern may include: determining a group size for a tone-group level interleaving pattern, where mapping one or more code blocks may be based on the group size. In some examples, configuring the interleaving pattern may include: configuring one of a time domain interleaving pattern or a frequency domain interleaving pattern based on at least one of a deployment characteristic of the channel or a transmission characteristic of the transmission.

In some aspects, configuring the interleaving pattern may include: dynamically or semi-statically configuring the interleaving pattern. In some cases, the interleaving pattern may include at least one of an intra-code block bit level interleaving pattern, intra-code block tone level interleaving pattern, intra-code block tone-group level interleaving pattern, an inter-code block bit level interleaving pattern, an inter-code block tone level interleaving pattern, an inter-code block tone-group level interleaving pattern, or any combination thereof. In some examples, determining the interleaving pattern may include: determining a group size for a tone-group level interleaving pattern, where decoding the one or more code blocks may be based on the group size. In some instances, determining the interleaving pattern may include: determining one of a time domain interleaving pattern or a frequency domain interleaving pattern based on at least one of a deployment characteristic of the channel or a transmission characteristic of the transmission. In some cases, the interleaving pattern may include at least one of an intra-code block bit level interleaving pattern, intra-code block tone level interleaving pattern, intra-code block tone-group level interleaving pattern, an inter-code block bit level interleaving pattern, an inter-code block tone level interleaving pattern, an inter-code block tone-group level interleaving pattern, or any combination thereof.

Interleaving pattern component 820 may determine a tone-group level interleaving configuration for the UE based at least in part on the condition of the channel. In some cases, determining a tone-group level interleaving configuration may include: determining to enable or disable tone-group level interleaving for the UE based at least in part on the condition of the channel. Interleaving pattern component 820 may enable tone-group level interleaving for the UE. In some examples, determining a tone-group level interleaving configuration may include: configuring one of a time domain interleaving pattern or a frequency domain interleaving pattern based at least in part on a deployment characteristic of the channel or a transmission characteristic of the transmission. In some aspects, determining a tone-group level interleaving configuration may include: determining a group size for each group of tones of a tone-group level interleaving pattern for the tone-group level interleaving configuration. In some examples, the group size is based at least in part on a number of tones in each group of tones. In some instances, the tone-group level interleaving configuration may include one or both of an intra-code block tone-group level interleaving pattern or an inter-code block tone-group level interleaving pattern. In some cases, determining a tone-group level interleaving configuration may include dynamically or semi-statically configuring tone-group level interleaving for the UE.

Resource mapper 825 may map one or more code blocks to physical resources of the channel based on the interleaving pattern.

Transmitting component 830 may transmit the one or more code blocks on the physical resources of the channel according to the mapping, transmit an indication of the interleaving pattern via a control message, and transmit an indication of the interleaving pattern via RRC signaling. Transmitting component 830 may transmit, to the UE, an indication of the tone-group level interleaving configuration. In some cases, the indication of the tone-group level interleaving configuration is transmitted via RRC signaling. In some examples, the indication of the tone-group level interleaving configuration is transmitted via a control message.

Receiving component 835 may receive the coded information via the channel, receive the indication of the interleaving pattern via a control message or RRC signaling, and receive an indication of enabling or disabling the interleaving pattern, where decoding the one or more code blocks may be based on the enabling or disabling. Receiving component 835 may receive the coded information via the channel, receive the indication of the interleaving pattern via a control message or RRC signaling, and receive an indication of enabling or disabling the interleaving pattern, where decoding the one or more code blocks may be based on the enabling or disabling. Receiving component 835 may receive, from a UE, a measurement report that indicates a set of channel statistics, wherein the set of channel statistics is associated with one or more of a channel quality, a signal-to-noise ratio, a delay spread or a Doppler spread. The transmission characteristic may be based at least in part on the set of channel statistics. Receiving component 835 may receive, from the UE, one or more code blocks via resources of the channel.

Information decoder 840 may decode one or more code blocks of the coded information based on the interleaving pattern. Information decoder 840 may de-interleave the one or more code blocks based at least in part on the tone-group level interleaving configuration.

Channel condition component 845 may determine a condition of the channel, where the interleaving pattern may be based on a transmission characteristic based on the condition of the channel. In some cases, determining the condition of the channel may include: determining at least one of a delay spread, a coherence bandwidth, an SNR, a measurement of an uplink channel condition, or a Doppler spread, or any combination thereof associated with the channel.

Measurement component 850 may receive a measurement report that indicates at least one of a delay spread, a coherence bandwidth, an SNR, a Doppler spread, or any combination thereof associated with the channel, where the condition of the channel is determined based on the measurement report. In some cases, the condition of the channel is determined based on a measurement of an uplink channel condition.

Measurement transmitter 855 may transmit a measurement report that indicates at least one of the delay spread, the coherence bandwidth, the SNR, or the Doppler spread, or any combination thereof associated with the channel.

Figure 9:
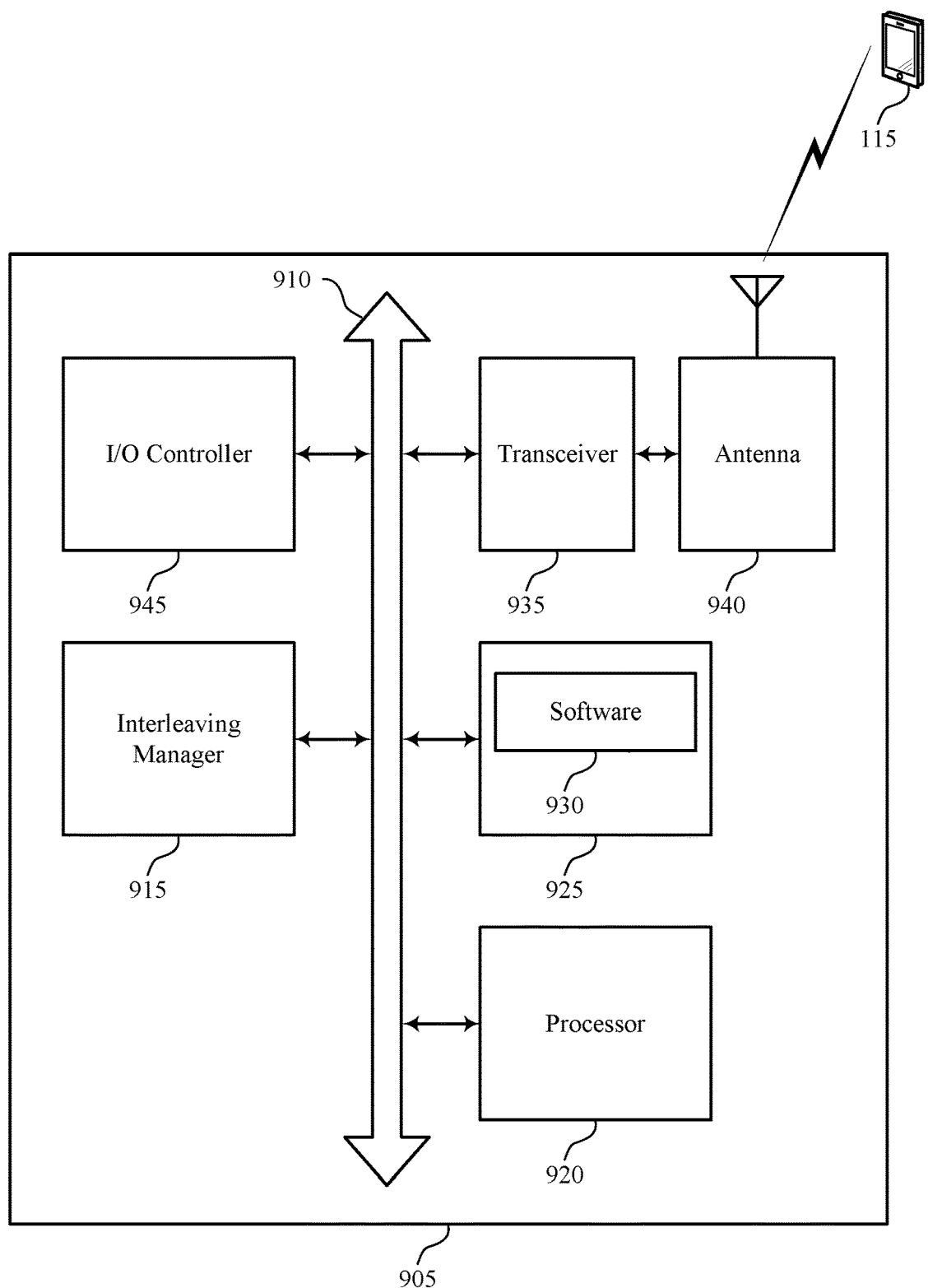
FIG. 9 illustrates a block diagram of a system including a wireless device that supports flexible interleaving for wireless communications in accordance with various aspects of the present disclosure.

FIG. 9 shows a diagram of a system 900 including a device 905 that supports flexible interleaving for wireless communications in accordance with various aspects of the present disclosure. Device 905 may be an example of or include the components of wireless device 605, wireless device 705, or a UE 115 and/or base station 105 as described above, e.g., with reference to FIGS. 1-3, 5, 6, and 7. Device 905 may include components for bi-directional voice and data communications including components for transmitting and receiving communications, including interleaving manager 915, processor 920, memory 925, software 930, transceiver 935, antenna 940, and I/O controller 945. These components may be in electronic communication via one or more busses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting flexible interleaving for wireless communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support flexible interleaving for wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
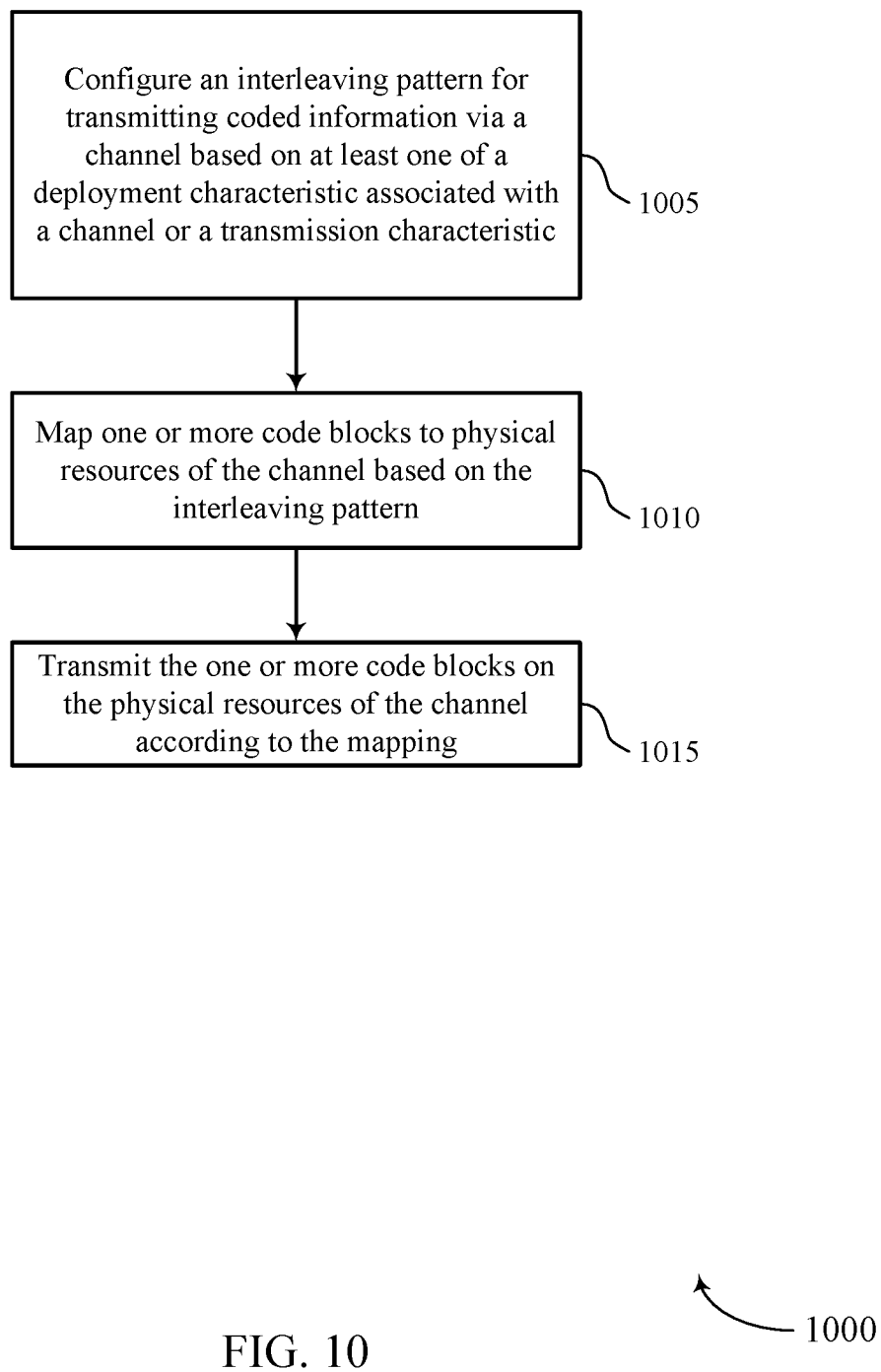
FIGS. 10 through 12 illustrate methods for flexible interleaving for wireless communications in accordance with various aspects of the present disclosure.

FIG. 10 shows a flowchart illustrating a method 1000 for flexible interleaving for wireless communications in accordance with various aspects of the present disclosure. The operations of method 1000 may be implemented by a UE 115 and/or base station 105 or its components as described herein. For example, the operations of method 1000 may be performed by an interleaving manager as described with reference to FIGS. 6 through 9. In some examples, a UE 115 and/or base station 105 may execute a set of codes to control the functional elements of the device to perform the functions described below. Additionally or alternatively, the UE 115 and/or base station 105 may perform aspects of the functions described below using special-purpose hardware.

At block 1005 the UE 115 and/or base station 105 may configure an interleaving pattern for transmitting coded information via a channel based at least in part on at least one of a deployment characteristic of the channel or a transmission characteristic of the transmission. The operations of block 1005 may be performed according to the methods described with reference to FIGS. 1 through 5. In certain examples, aspects of the operations of block 1005 may be performed by an interleaving pattern component as described with reference to FIGS. 6 through 9.

At block 1010 the UE 115 and/or base station 105 may map one or more code blocks to physical resources of the channel based at least in part on the interleaving pattern. The operations of block 1010 may be performed according to the methods described with reference to FIGS. 1 through 5. In certain examples, aspects of the operations of block 1010 may be performed by a resource mapper as described with reference to FIGS. 6 through 9.

At block 1015 the UE 115 and/or base station 105 may transmit the one or more code blocks on the physical resources of the channel according to the mapping. The operations of block 1015 may be performed according to the methods described with reference to FIGS. 1 through 5. In certain examples, aspects of the operations of block 1015 may be performed by a transmitting component as described with reference to FIGS. 6 through 9.

Figure 11:
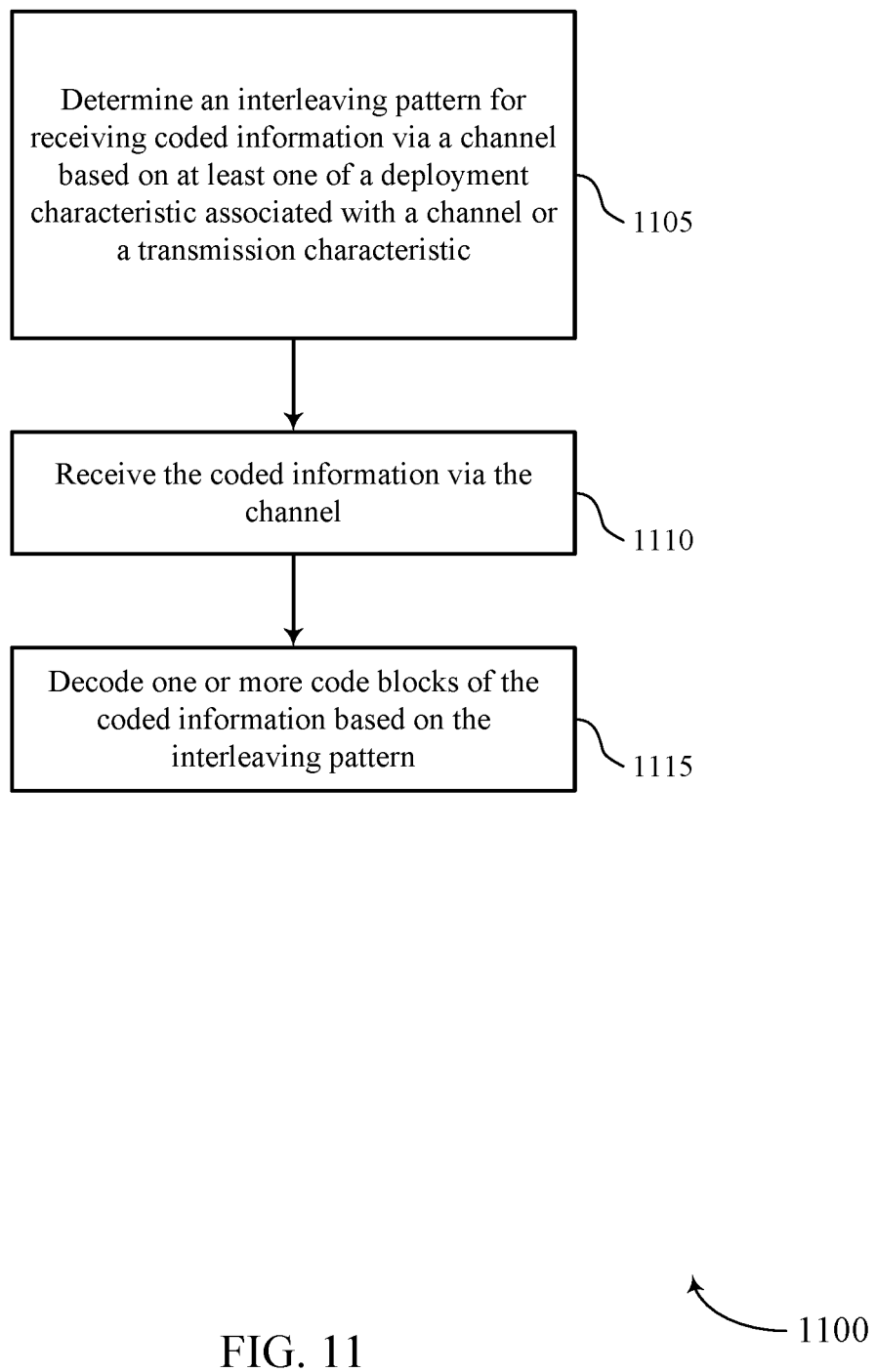

FIG. 11 shows a flowchart illustrating a method 1100 for flexible interleaving for wireless communications in accordance with various aspects of the present disclosure. The operations of method 1100 may be implemented by a UE 115 and/or base station 105 or its components as described herein. For example, the operations of method 1100 may be performed by an interleaving manager as described with reference to FIGS. 6 through 9. In some examples, a UE 115 and/or base station 105 may execute a set of codes to control the functional elements of the device to perform the functions described below. Additionally or alternatively, the UE 115 and/or base station 105 may perform aspects of the functions described below using special-purpose hardware.

At block 1105 the UE 115 and/or base station 105 may determine an interleaving pattern for receiving coded information via a channel based at least in part on at least one of a deployment characteristic of the channel or a transmission characteristic of the transmission. The operations of block 1105 may be performed according to the methods described with reference to FIGS. 1 through 5. In certain examples, aspects of the operations of block 1105 may be performed by an interleaving pattern component as described with reference to FIGS. 6 through 9.

At block 1110 the UE 115 and/or base station 105 may receive the coded information via the channel. The operations of block 1110 may be performed according to the methods described with reference to FIGS. 1 through 5. In certain examples, aspects of the operations of block 1110 may be performed by a receiving component as described with reference to FIGS. 6 through 9.

At block 1115 the UE 115 and/or base station 105 may decode one or more code blocks of the coded information based at least in part on the interleaving pattern. The operations of block 1115 may be performed according to the methods described with reference to FIGS. 1 through 5. In certain examples, aspects of the operations of block 1115 may be performed by an information decoder as described with reference to FIGS. 6 through 9.

Figure 12:
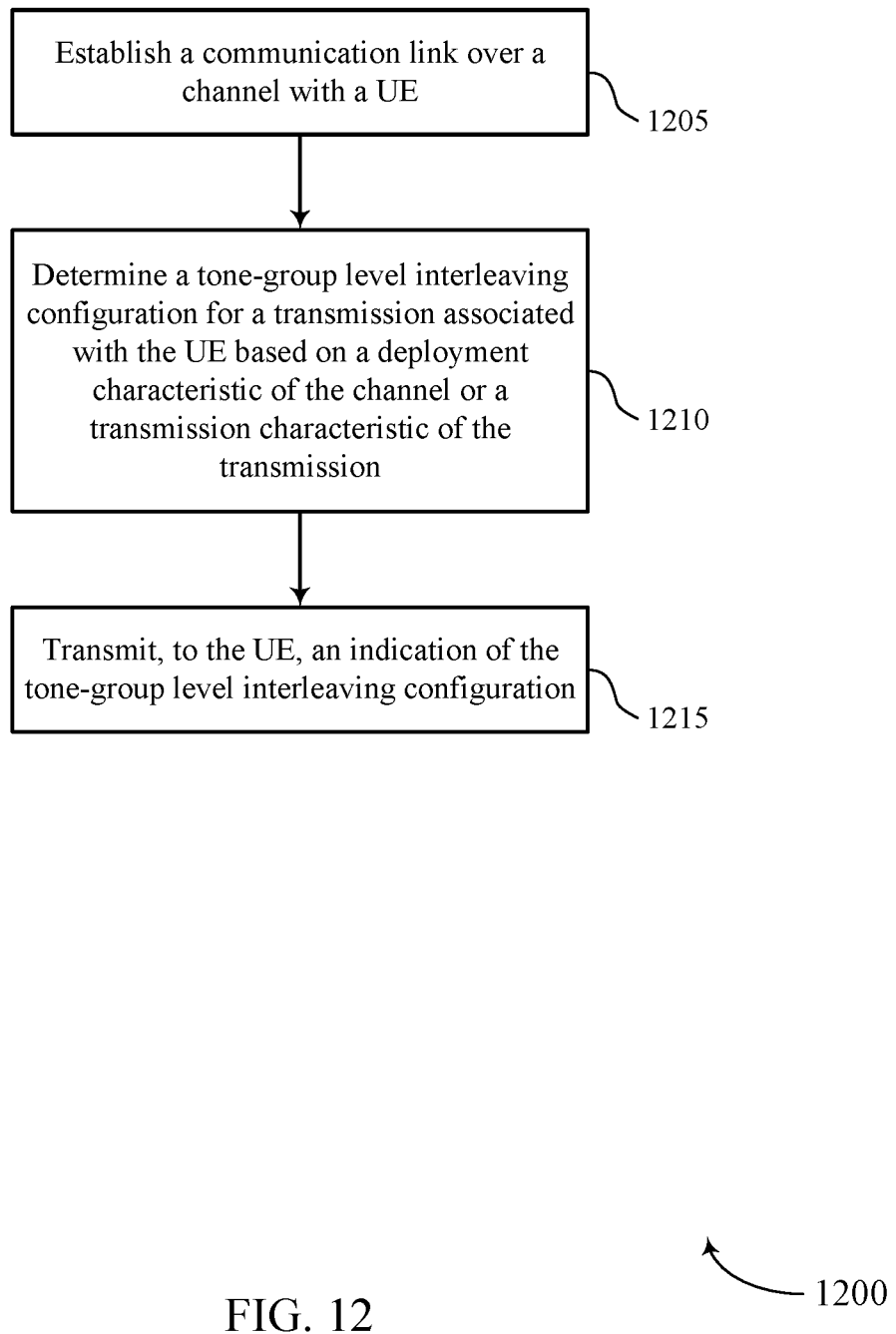

FIG. 12 shows a flowchart illustrating a method 1200 for flexible interleaving for wireless communications in accordance with aspects of the present disclosure. The operations of method 1200 may be implemented by a base station 105 or its components as described herein. For example, the operations of method 1200 may be performed by an interleaving manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1205, the base station 105 may establish a communication link over a channel with a UE. The operations of block 1205 may be performed according to the methods described herein. In certain examples, aspects of the operations of block 1205 may be performed by an interleaving manager as described with reference to FIGS. 6 through 9.

At block 1210, the base station 105 may determine a tone-group level interleaving configuration for a transmission associated with the UE based at least in part on a deployment characteristic of the channel or a transmission characteristic of the transmission. The operations of block 1210 may be performed according to the methods described herein. In certain examples, aspects of the operations of block 1210 may be performed by an interleaving pattern component as described with reference to FIGS. 6 through 9.

At block 1215, the base station 105 may transmit, to the UE, an indication of the tone-group level interleaving configuration. The operations of block 1215 may be performed according to the methods described herein. In certain examples, aspects of the operations of block 1215 may be performed by a transmitting component as described with reference to FIGS. 6 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or a NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on SPEC A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a base station, comprising:
establishing a communication link over a channel with a user equipment (UE);
determining a transmission characteristic of a transmission associated with the UE including a resource allocation type of the transmission;
determining one of a time domain interleaving pattern or a frequency domain interleaving pattern for a tone-group level interleaving configuration for the transmission associated with the UE;
determining the tone-group level interleaving configuration for the transmission based at least in part on the resource allocation type of the transmission characteristic of the transmission; and
transmitting, to the UE, an indication of the tone-group level interleaving configuration.

2. The method of claim 1, wherein determining the tone-group level interleaving configuration comprises:
determining a number of tones in each group of tones of a tone-group level interleaving pattern for the tone-group level interleaving configuration.

3. The method of claim 1, wherein determining the tone-group level interleaving configuration comprises:
determining to enable or disable tone-group level interleaving for the UE based at least in part on a condition of the channel.

4. The method of claim 3, further comprising:
enabling tone-group level interleaving for the UE;
receiving, from the UE, one or more code blocks via resources of the channel; and
de-interleaving the one or more code blocks based at least in part on the tone-group level interleaving configuration.

5. The method of claim 1, further comprising:
determining the tone-group level interleaving configuration for the transmission based on a deployment characteristic of the channel,
wherein the deployment characteristic comprises a frequency of the channel, a bandwidth of the channel, a subcarrier spacing for the channel, or any combination thereof.

6. The method of claim 1, wherein the transmission characteristic further comprises a code block size for the transmission, a modulation and coding scheme (MCS) for the transmission, a number of layers for the transmission, a channel delay spread, a Doppler spread, a signal to noise ratio of the channel or any combination thereof.

7. The method of claim 6, further comprising:
receiving a measurement report comprising a set of channel statistics, wherein the transmission characteristic is based at least in part on the set of channel statistics.

8. The method of claim 1, wherein the transmission characteristic is based at least in part on a measurement of an uplink channel condition.

9. The method of claim 1, wherein the tone-group level interleaving configuration comprises one or both of an intra-code block tone-group level interleaving pattern or an inter-code block tone-group level interleaving pattern.

10. The method of claim 1, wherein determining the tone-group level interleaving configuration comprises:
dynamically or semi-statically configuring tone-group level interleaving for the UE.

11. The method of claim 1, wherein the indication of the tone-group level interleaving configuration is transmitted via radio resource control (RRC) signaling.

12. The method of claim 1, wherein the indication of the tone-group level interleaving configuration is transmitted via a control message.

13. A method for wireless communications at a user equipment (UE), comprising:
establishing a communication link over a channel with a base station;
receiving communication parameters including a resource allocation type for a transmission associated with the base station;
receiving an indication of a tone-group level interleaving configuration;
determining the tone-group level interleaving configuration for the transmission based at least in part on the communication parameters including the resource allocation type and the indication; and
de-interleaving the transmission, from the base station, based at least in part on tone-group level interleaving configuration.

14. The method of claim 13, further comprising:
determining the tone-group level interleaving configuration comprises configuring one of a time domain interleaving pattern or a frequency domain interleaving pattern for the transmission.

15. The method of claim 13, wherein determining the tone-group level interleaving configuration comprises:
determining a number of tones in each group of tones of a tone-group level interleaving pattern for the tone-group level interleaving configuration.

16. The method of claim 13, wherein determining the tone-group level interleaving configuration comprises:
determining whether tone-group level interleaving is enabled or disabled for the UE.

17. The method of claim 16, further comprising:
determining tone-group level interleaving is enabled; and
transmitting, to the base station, one or more code blocks via resources of the channel.

18. The method of claim 13, wherein the communication parameters comprise a deployment characteristic of the channel or a transmission characteristic of the transmission associated with the base station.

19. The method of claim 18, wherein the deployment characteristic comprises a frequency of the channel, a bandwidth of the channel, a subcarrier spacing for the channel, or any combination thereof.

20. The method of claim 18, wherein the transmission characteristic further comprises a code block size for the transmission, a modulation and coding scheme (MCS) for the transmission, a number of layers for the transmission, a channel delay spread, a Doppler spread, a signal to noise ratio of the channel or any combination thereof.

21. The method of claim 20, further comprising:
transmitting a measurement report comprising a set of channel statistics, wherein the transmission characteristic is based at least in part on the set of channel statistics.

22. The method of claim 18, wherein the transmission characteristic is based at least in part on a measurement of an uplink channel condition.

23. The method of claim 18, wherein the tone-group level interleaving configuration comprises one or both of an intra-code block tone-group level interleaving pattern or an inter-code block tone-group level interleaving pattern.

24. The method of claim 13, wherein the indication of the tone-group level interleaving configuration is received dynamically or semi-statically from the base station.

25. The method of claim 13, wherein the indication of the tone-group level interleaving configuration is received via radio resource control (RRC) signaling or a control message.

26. An apparatus for wireless communications at a base station, comprising:
a processor;
memory coupled to the processor, the processor and memory configured to:
establish a communication link over a channel with a user equipment (UE);
identify a transmission characteristic of a transmission associated with the UE including an allocation type of the transmission;
determine one of a time domain interleaving pattern or a frequency domain interleaving pattern for a tone-group level interleaving configuration for the transmission associated with the UE;
determine the tone-group level interleaving configuration for the transmission based at least in part on the allocation type of the transmission characteristic of the transmission; and
transmit, to the UE, an indication of the tone-group level interleaving configuration.

27. The apparatus of claim 26, wherein the processor and memory are further configured to:
determine a number of tones in each group of tones of a tone-group level interleaving pattern for the tone-group level interleaving configuration.

28. An apparatus for wireless communications at a user equipment (UE), comprising:
a processor;
memory coupled to the processor, the processor and memory configured to:
establish a communication link over a channel with a base station;
receive communication parameters including a resource allocation type for a transmission associated with the base station;
receive an indication of a tone-group level interleaving configuration;
determine the tone-group level interleaving configuration for the transmission based at least in part on the communication parameters including the resource allocation type and the indication; and
de-interleave the transmission, from the base station, based at least in part on tone-group level interleaving configuration.

29. The apparatus of claim 28, wherein the processor and memory are further configured to:
determine the tone-group level interleaving configuration comprises configuring one of a time domain interleaving pattern or a frequency domain interleaving pattern for the transmission.

30. The apparatus of claim 28, wherein the processor and memory are further configured to:
determine a number of tones in each group of tones of a tone-group level interleaving pattern for the tone-group level interleaving configuration.

* * * * *